Dec. 20, 1966  R. F. NAIRN ETAL  3,293,094
TEXTURED FOAM PROCESSES
Filed Dec. 20, 1965  4 Sheets-Sheet 1
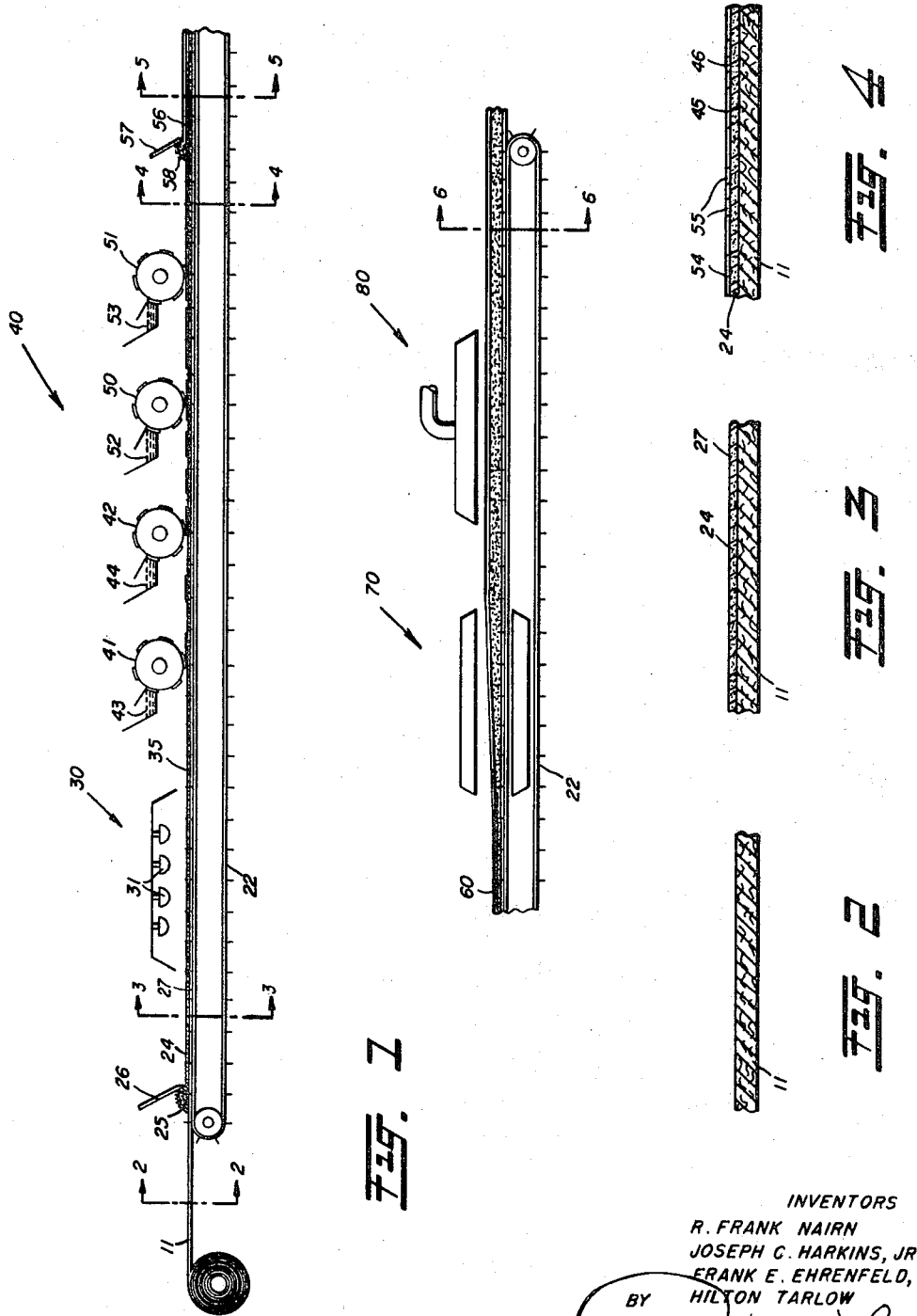
INVENTORS
R. FRANK NAIRN
JOSEPH C. HARKINS, JR.
FRANK E. EHRENFELD, JR.
BY  HILTON TARLOW
ATTORNEY

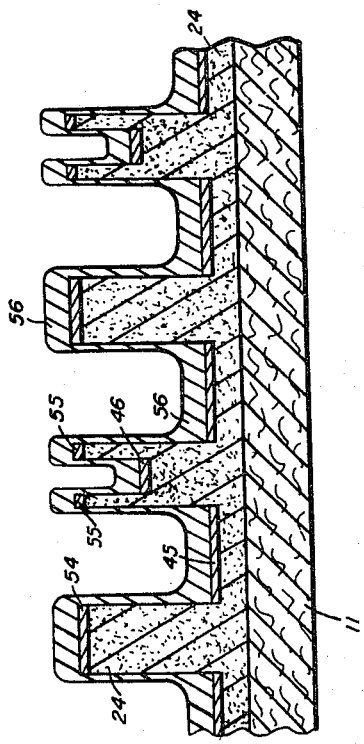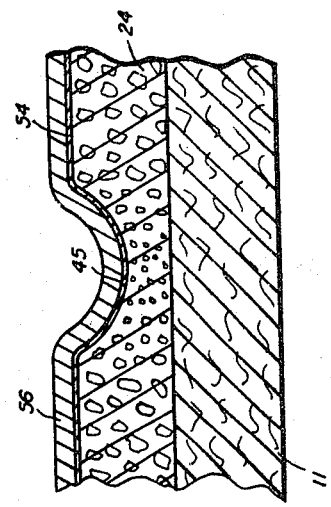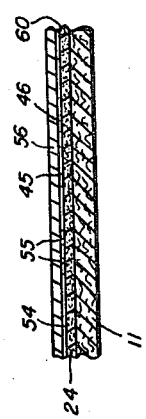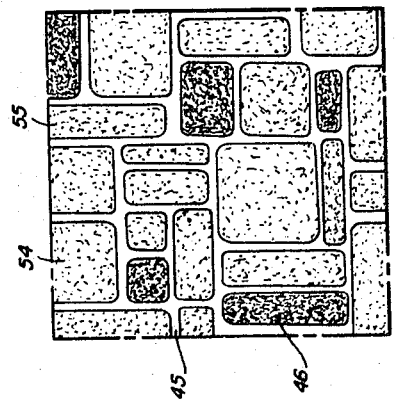

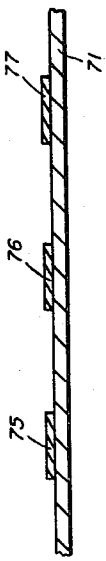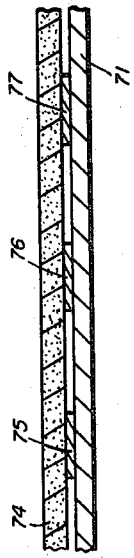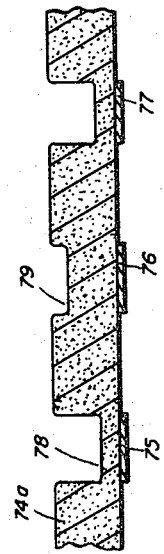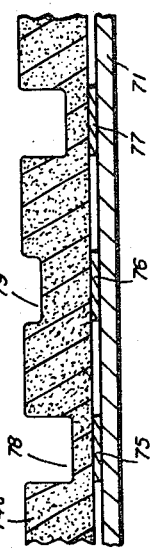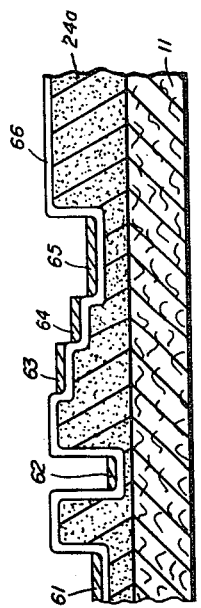

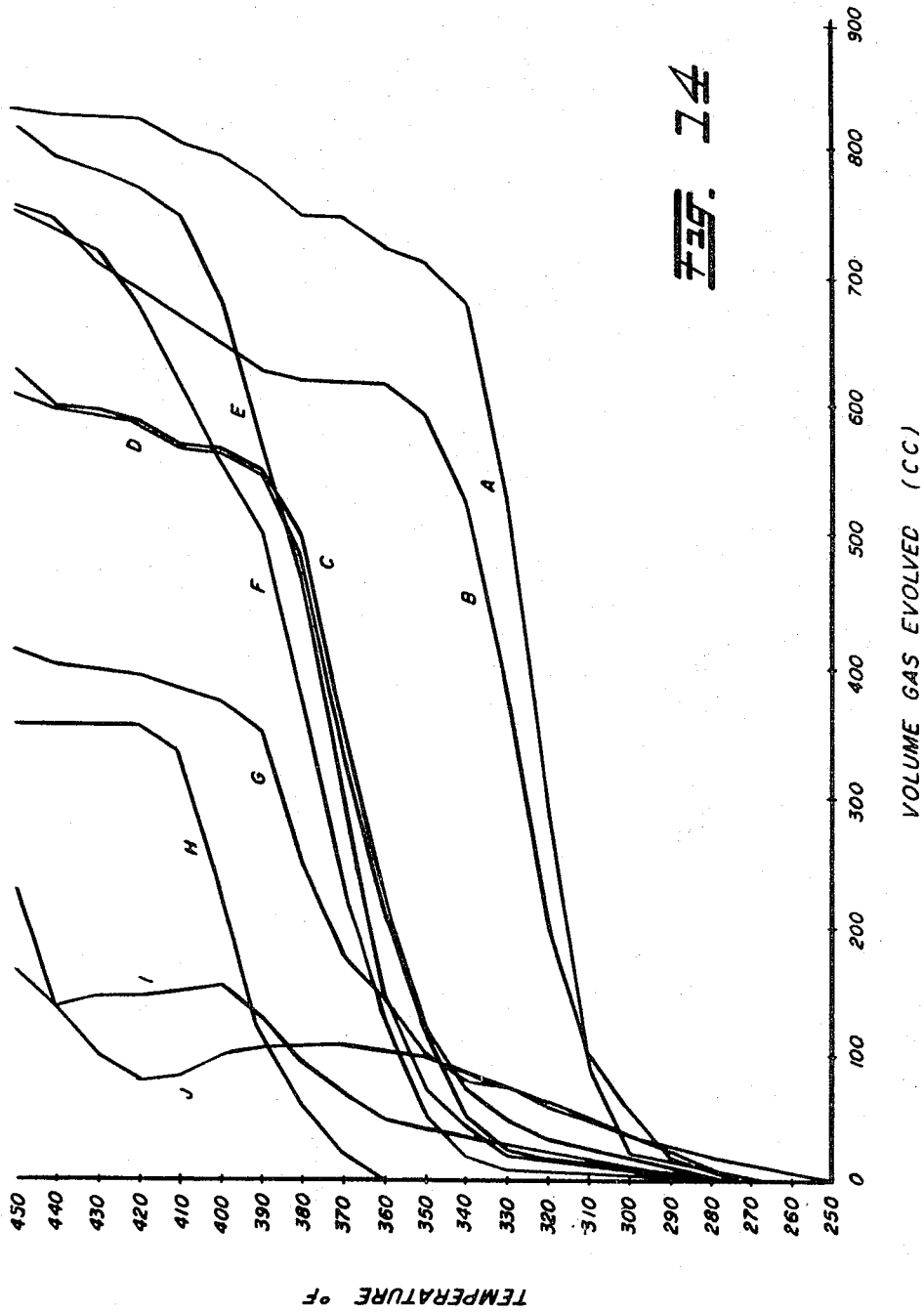

# United States Patent Office 3,293,094
Patented Dec. 20, 1966

3,293,094
TEXTURED FOAM PROCESSES
R. Frank Nairn, Kennett Square, Pa., Joseph C. Harkins, Jr., Franklin Lakes, N.J., and Frank E. Ehrenfeld, Jr., Brookhaven, and Hilton Tarlow, Philadelphia, Pa., assignors to Congoleum-Nairn Inc., Kearny, N.J., a corporation of New York
Filed Dec. 20, 1965, Ser. No. 522,006
62 Claims. (Cl. 156—79)

This application is a continuation-in-part of applications Ser. No. 508,184, filed Oct. 22, 1965, Ser. No. 487,441, filed Sept. 15, 1965, Ser. No. 435,276, filed Feb. 25, 1965, Ser. No. 377,023, filed June 22, 1964 and Ser. No. 309,738, filed Sept. 18, 1963. All of these parent applications have been abandoned.

This invention relates to methods for producing cellular foam products having an embossed surface. The products produced by these methods are claimed in companion application Ser. No. 508,185, filed Oct. 22, 1965, which is also a continuation-in-part of application Ser. No. 309,738, filed Sept. 18, 1963, now abandoned.

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability. It is common practice to emboss the surface of such sheets to give added decorative appeal and, in many instances, further utility. Typical of the types of embossings are those which simulate leather or textured cloth, such as linen. In some instances, the embossed areas are filled in with pigmented ink by techniques known as "spanishing" or "valley printing." Designs have also been printed on the surface of resinous composition sheets and, in many instances, the designs have been protected by the application of a transparent or translucent overcoating.

The introduction of cellular resinous compositions has led to their incorporation in products such as recited above, either alone, or in combination with non-cellular resinous composition surface wear layers and/or backing webs. The cellular foam sheet gives the product various desirable properties, depending on the type of cellular foam, such as high resiliency and good feel or "hand."

Embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet.

Another embossing procedure applicable to foamable compositions is disclosed in U.S. Patent 2,943,949 which issued to Robert K. Petry on June 5, 1960. In this patent, a web which can remain as part of the finished product or be subsequently removed is embossed with a design, a resinous layer containing a blowing agent is applied to the surface of the embossed web to form a relatively smooth layer and then the foamable composition is heated to decompose the blowing agent and fuse the composition. Since a greater thickness of foamable composition is present in the areas over the depressions in the web, the surface of the sheet is raised at these points to give a reverse image of the embossings. This type of product can be given greater wear resistance by applying a non-cellular resinous composition in the form of a preformed sheet or as a coating over the surface either prior to decomposing the blowing agent or subsequent to such decomposition.

Various methods have been suggested for producing cellular foam products having a textured or embossed surface without utilizing embossing rolls. Embossing rolls are expensive to produce and when combined with a valley printing operation are difficult to control. In some instances, it is desired to print a design and then emboss in register with the design. Such an operation requires very complex equipment. Additionally, embossing of curved or irregular surfaces is very difficult.

One method which eliminates embossing rolls is disclosed in U.S. Patent 2,961,332 which issued to R. Frank Nairn on Nov. 22, 1960. In accordance with this patent, a layer of foamable resinous composition is formed on a base by printing a number of different resinous compositions each containing its own amount or type of blowing agent. The layer is then heated to decompose the blowing agent and fuse the composition. The product has an irregular or textured surface conforming to the amount or type of blowing agent in the various printed compositions. Another method is disclosed in U.S. Patent 2,964,-799 which issued to P. E. Roggi et al. on Dec. 20, 1960. According to this patent, a foamable resinous composition is formed into a self-supporting sheet of fused composition. Heat is then applied to the foamable composition sheet at various points to cause the blowing agent at those points to decompose and form a cellular structure. The raised areas in the finished sheet correspond to the points of heat application. U.S. Patent 2,825,282 which issued to J. B. Gergen et al. on Mar. 4, 1958 discloses a related method for producing a letterpress makeready. In accordance with this latter patent, a foamable composition is formed into a sheet and then printed with inks containing radiant energy-absorbing pigments. On exposure of the sheet to radiant energy, the blowing agent in contact with the pigments receives more intense heat and, therefore, will decompose and form cellular foam without affecting the unprinted portions of the sheet. As is apparent, the heating must be very rapid and carefully controlled. All of these methods are difficult and expensive in adaptation to commercial operations. Additionally, the type of product which can be produced is severely limited by the nature of the particular process selected.

The primary object of the invention is to provide a simple process for producing a resinous composition product having a textured or embossed surface. Another object is to provide such a process which is readily adaptable to standard printing equipment. Another object of the invention is to provide an embossed product of novel construction. A further object of the invention is to provide a process which allows the production of resinous composition sheets having embossed areas in register with a printed design. A still further object is to provide an embossing process which is readily adaptable to curved and irregular surfaces. Other objects and the advantages of the invention will appear hereinafter.

In accordance with the invention, it has been discovered that it is possible to control the decomposition temperature of a chemical blowing agent dispersed in a resinous polymer composition by applying a reactive chemical compound, referred to in this specification and claims as a "regulator" or "inhibitor," on the surface of such a composition. The regulator or inhibitor controls the decomposition temperature of the blowing agent in the area of application. This discovery makes possible the production of a large range of resinous polymer cellular foam products having embossed surfaces by simply applying to the surface in the design desired an inhibitor and then heating the composition to selectively decompose the blowing agent. The resulting product is depressed or raised at the area of inhibitor application.

The foamable composition can be a layer of a resinous composition having a blowing agent distributed throughout its thickness, or a resinous layer in which the blowing agent is only in one portion or stratum thereof. A foamable composition of the latter description can be prepared, for example, by laminating a foamable resinous layer of uniform composition with a resinous layer containing no blowing agent.

The inhibitor composition can be transparent so that the appearance of the product is not altered other than in being embossed. Alternately, the inhibitor can be part of an ink composition so that the colored ink or colors of the inks appear in the areas of inhibitor application. Further, the inhibitor can be applied to a supporting base or on the underside of the resinous layer and the embossing will appear on the opposite surface.

The depth of the depressed or raised areas can be controlled by varying the concentration and/or type of inhibitor. This varied concentration can be effected by the amount of vehicle applied as well as the concentration of the inhibitor in the ink. Additionally, the inhibitor can be printed or otherwise applied to a release paper or as a decalcomania.

This discovery makes possible the production of a product having embossed surfaces which can be in complete register with a printed design. Additionally, the discovery makes possible the utilization of any type of printing apparatus as an embosser, thereby eliminating the need for expensive embossing rolls and related equipment. Further, it allows the embossing of a surface without exerting pressure on the surface and without regard to the shape of the surface. The number of products which can be produced by the process is unlimited. It can be used for producing floor, wall and ceiling coverings, drapery, upholstery and clothing materials, tents and the like, and, in fact, wherever resinous plastic sheets or compositions are utilized. It is readily adaptable to decorating any surface on which foamable compositions can be applied such as automobile interiors, boots, boxes and packing cartons, book covers, maps, road markers, glass and plastic containers, and the like.

The results obtained by this invention are very unexpected since it would not be anticipated that an agent printed or applied on or adjacent to the surface of a foamable resinous polymer composition would have any effect on the decomposition temperature of the chemical blowing agent contained within the composition. The only known related effect is that certain metal stabilizers, such as dibasic lead phosphite, reduce the decomposition temperature of blowing agents. The reason for the effectiveness of the invention is not understood. It is apparent, however, that at least a portion of the inhibitor is soluble or diffusible in the foamable composition at the decomposition temperature and, therefore, during heating passes into the formable composition and either reacts with the blowing agent or otherwise effects the blowing agent and thereby alters the decomposition temperature of the blowing agent it contacts. It is believed that this solubility could be due to the plasticizer in the composition.

The invention will be better understood from the following detailed description of various embodiments of the inventions when read in connection with the drawings wherein FIGURE 1 is a schematic representation of one method of producing a sheet in accordance with the invention;

FIGURES 2 to 5 are enlarged cross-sectional views of the product in various stages of manufacture as shown in FIGURE 1, the relative relationship of the various layers are not in proportion;

FIGURE 6 is an enlarged cross-sectional view of the product with the various layers not in proportion for illustrative purposes;

FIGURE 7 is an enlarged cross-section of a finished product showing the difference in cell size of the cellular composition as it appears in one embodiment of the invention. The decomposition of the blowing agent is incomplete in the depressed areas as compared to the other areas;

FIGURE 8 is a plan view of the finished product of FIGURE 6;

FIGURE 9 is an enlarged cross-sectional view of another type of product formed in accordance with the invention wherein a non-foamable composition layer was applied over the foamable composition and the inhibitor was applied to the surface of the non-foamable composition;

FIGURES 10 to 13 are enlarged cross-sectional views of various stages of an alternate process for preparing a product in accordance with the invention; and FIGURE 14 is a graph showing the volume of gas given off by various combinations of blowing agents and inhibitors at various temperatures.

In accordance with one embodiment of the invention a resinous polymer cellular foam sheet is produced having a textured or embossed surface with substantially fewer and/or smaller foam cells in the embossed areas by applying a layer of a first resinous polymer composition containing a blowing agent to a base, heating the coating to at least partially gel the composition without decomposing the blowing agent to yield a relatively solid surface, printing or otherwise applying on the surface of the gelled sheet a composition containing an inhibitor which will alter the decomposition temperature of the blowing agent, applying a second resinous polymer composition which does not contain a blowing agent over the printed surface and thereafter heating the composite structure to fuse the compositions and selectively decompose the blowing agent and form a cellular foam composition of the first layer. The heating must be carefully controlled so that the temperature of the composition is sufficient to decompose the blowing agent in the areas which do not contain the inhibitor without substantially decomposing it in the areas containing the combination of blowing agent and inhibitor. The portions of the foamable layer contacted by the inhibitor for the blowing agent will foam to a lesser degree, or not at all, than the other portions of the foamable layer. This is believed to be caused in this illustration by a chemical reaction taking place between the inhibitor and the blowing agent which results in a compound or composition having a decomposition temperature substantially higher from that of the blowing agent which is not contacted by the inhibitor. The finished product has a surface which is embossed. The surface of the product is covered completely by a solid layer formed by the second coat. This procedure provides a simple method for producing a foam product having a substantially thick wear-resistant surface layer and a textured surface. If the inhibitor composition or compositions are pigmented then the embossed areas, accordingly, are pigmented. As is apparent, the inhibitor can be added to one or more printing inks which make up a design printed on the gelled foamable composition.

As an alternate method, the foam inhibiting agent can be printed or otherwise applied to a supporting base and then the foamable composition applied over the inhibiting agent. The base in this instance can be, if desired, a transfer sheet and the design applied to form a decalcomania. Additionally, the foamable composition can be formed into a fused or partially fused sheet without decomposing the blowing agent, such as by calendering, and then the inhibitor applied to either surface of the sheet. As another alternate method, a non-foaming solid resinous polymer composition can be applied over the foamable composition and the inhibitor applied on the surface of the solid composition. During heating, the inhibitor will migrate through the composition which does not contain a blowing agent into the foamable layer. As is apparent in such a system, the concentration of applied inhibitor would have to be greater than if applied directly to the foamable composition to obtain the same degree of embossing.

In another alternate method, the application of the wear layer can be omitted until after the decomposition of the blowing agent and the fusion of the cellular foam layer. The wear layer can then be applied by any suitable means, such as a spray coating, laminating a film, or the like. If desired, the solid wear layer can be omitted entirely. With many inhibitors, the presence of the wear or overlayer is desirable since it prevents the loss of the inhibitor by volatilization.

As indicated, the invention has the advantage of eliminating the need for embossing rolls and pressure to produce a textured or embossed surface and thereby greatly reduces the cost. The time required to produce an embossing roll is substantially greater than a printing cylinder. In addition, errors in a printing cylinder are easier to correct than in an embossing cylinder. Also, when embossing a resinous polymer cellular foam sheet with pressure, it always results in densifying the sheet. According to this invention, the cellular foam sheet is not densified and, therefore, a product having an excellent hand, feel or drape can be obtained. One of the most advantageous features of the invention is that the textured or embossed areas can be in complete register with a printed design. It should be understood, however, that the inhibitor can also be applied at random rather than as an exact reproducible design.

One arrangement of apparatus is shown in the drawings. Referring to the drawings, a web, such as a felt sheet 11, is placed on a conveyor, as for example, a continuous belt 22. A first coat 24 of resinous composition 25 containing a chemical blowing agent is applied to the upper surface of the base 11 by any suitable means such as a reverse roll coater, a doctor blade or similar coating apparatus. If a doctor blade 26 is used, a reservoir of the resinous composition 25 is maintained behind the blade allowing a uniform coat of the composition to be applied to the surface of the felt. The coated base 27 is then passed through a heating unit generally indicated at 30 which can be any conventional heating means such as a bank of infra-red heating lamps 31. The heating unit supplies sufficient heat to at least partially gel the thermoplastic resinous coating without decomposing the blowing agent. The gelled coating 35 is then passed to a printing unit generally indicated at 40 which can be any of the conventional printing means such as a silk screen apparatus, a flat bed printing machine as widely used in the smooth surface flooring industry, or a conventional gravure press having cylinders 41, 42, 50 and 51, which are etched to print a design with a suitable ink on the surface of the gelled sheet. The cylinders pick up printing ink compositions 43, 44, 52 and 53 on their etched surface and apply the printing composition on the surface of the gelled layer 35. The etched printing cylinders have the engraved areas substantially enlarged in the drawing for purposes of illustration. The printing composition is conventionally dried in the printing press. One or more of the printing ink compositions contain the inhibitor for the blowing agent in the foamable composition. In this illustration, inks 43 and 52 and, therefore, design portions 45 and 46, contain the inhibitor for the blowing agent. Ink deposit 46 contains a lower concentration of inhibitor than ink deposit 45. A second coat 56 of resinous composition is then applied over the printed surface by any conventional coating means such as a doctor blade 57 which supplies the composition from a reservoir 58 held back of the doctor blade. This second coating 56 can be transparent, translucent, or pigmented opaque. The inks will not be visible from the surface of the product if the coating is opaque and, therefore, pigmented inks are limited to those products in which they would be visible. After applying the second coating 56, the composite structure is then passed through a heating unit generally indicated at 70. The heating unit can be any heating apparatus such as a hot air oven or infrared heat lamps. It is preferred to have a heating unit which heats both surfaces of the sheet. The heating unit raises the temperature of the compositions on the base sheet 60 sufficiently high to cause the selective decomposition of the blowing agent contained in the first coat 24 and to completely solvate and fuse both resinous compositions of coats 24 and 56. The product is thereafter passed through a cooling chamber generally indicated at 90 to cool the product. The cellular foam areas in contact with the design portions 54 and 55 have reached their maximum expansion. The foam in contact with the portion 46 of the design is only partly foamed and the part of the foamable layer 24 in contact with design portion 45 has substantially no foam structure. If the product is going to be used in areas which are not subjected to substantial wear, the second coat can be omitted entirely. As indicated, the second coat of resinous composition can be transparent if a design is printed on the first coat or it can be opaque. The backing can remain as part of the product or it can be removed from the product. Additionally, the inhibitor for the blowing agent can be printed or otherwise applied to the base and then the foamable composition applied over the inhibitor. In this latter method, the inhibitor composition can be pigmented so that it is visible from the surface of the product if complete inhibition of the blowing agent is obtained and no pigment is in the foamable composition. The non-foam areas will, therefore, be transparent so that the inhibitor composition is visible from the surface of the product.

The cross-section of another form of a product is shown in FIGURE 9. In this modification, the foamable composition 24 is applied to the base and gelled by heating as described above without decomposing the blowing agent. The resinous composition 56 which does not contain any blowing agent is then applied over the surface of the gelled coating and heated to gel the second coating. A composition containing the inhibitor is then applied to the surface of the second gelled sheet in various concentrations as 61, 62, 63, 64 and 65. The composite sheet is then heated to decompose selectively the blowing agent and convert the first coating 24 to a cellular foam composition 24a. The cellular foam composition has foamed less in the areas contacted by inhibitor 61, 62, 63, 64, and 65, giving the product an embossed appearance. In this method, the degree of inhibition is dependent on the migration of the inhibitor through layer 56 into the foamable layer 24. The migration can be improved, in some instances, by preheating the composition for a period of time below the decomposition temperature of the blowing agent.

In FIGURES 10 to 13, another alternate process is shown. In this process, a thin release paper 71 is printed with ink composition 75, 76, 77 containing an inhibitor in any desired design. A foamable layer 74 is then applied over the printed design. The foamable layer 74 can be a preformed sheet containing a blowing agent or a coating. The foamable layer is then heated to decompose the blowing agent to form a cellular foam layer 74a. The layer has depressed areas 78, 79 of less or no foam structure. After cooling of the product, the release paper is removed. The printed decoration is greatly enlarged as shown in FIGURE 13 and actually would be flush with the surface in the final product. This method is excellent for applying decorations on foam articles during manufacture. Such a procedure, for example, is a simple method for producing products for use as drapery material rendering the preliminary gelling of the resinous composition to allow printing of the inhibitor unnecessary. As indicated above, if the foamable composition is not pigmented the non-foam area will be transparent so that the inhibitor composition is visible from the opposite side of the sheet.

Another method which can be utilized to good advantage is the printing or application of the inhibitor to the foamable composition while it is in a liquid state. Such a system also eliminates the need for a first heating step to gel the composition to make the system printable. One means of accomplishing this is by the application of the inhibitor to a base or release paper in the form of a design and then casting the liquid composition over the printed base. Another means is to apply the inhibitor directly on the liquid composition. This can be carried out, for example, by spraying, using stencils, or other means to control the areas of application of the inhibitor. Another means is by the use of electrostatic printing with dry inhibitor composition which can be accomplished by the use of silk screens or the like which do not touch the liquid composition. Suitable apparatus for such electrostatic printing is disclosed in U.S. Patent 3,081,698, issued Mar. 19, 1963 to C. O. Childress et al.

In all of the embodiments of the invention described above in connection with the drawings, the inhibitor prevents or reduces the amount of decomposition of the blowing agent in the areas contacted by the inhibitor. As indicated above, the inhibitor can also cause the area it contacts to be raised above the other areas of the composition by causing decomposition of the blowing agent contacted by the inhibitor to take place at a lower temperature than the remaining blowing agent. The resulting products using this method can be identical in appearance to the products resulting from the other methods.

The backing web utilized will depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos and various synthetic fibers. Where loosely woven fabrics such as burlap are used, the fabric can be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

Felted cellulose or mineral fibrous sheets are particularly useful in accordance with the invention for producing products for use as surface coverings since they are low in cost and yet are flexible and strong. The sources of cellulose can include cotton or other rags, wood pulp, paper boxes, or mixtures thereof in any proportion. Asbestos is the most commonly used mineral fiber. The sheet is usually prepared by forming a slurry of fibrous material in water and forming into a sheet using any of the techniques conventionally employed in the manufacture of paper. For example, sheet formation can take place on a Fourdrinier or cylinder sheet-forming machine. The fibrous sheet so prepared is then dried. In addition to cellulose and mineral fibers, other fibers can be used including fibers of synthetic and animal origin.

A felted fibrous sheet as produced by conventional sheet-forming techniques is usually unsatisfactory, if it is going to remain as part of the product, without impregnation with a water-resistant and strengthening impregnant, due to poor strength and water resistance. The particular impregnant chosen must not only be capable of imparting strength and water resistance to the sheet, but must also meet other requirements as to its physical behavior at high temperatures. The coating compositions applied to the backing utilizing the preferred compositions of the invention must be heated to temperatures of from 300° F. to 400° F. in order to fuse the resin and/or expand the composition into a cellular foam. Thus, the impregnant chosen must be relatively stable at these temperatures. The impregnant also should be substantially free of any components which are volatile at these temperatures and it also must not soften to such an extent as to exude from the sheet. In addition, the impregnant should not be subject to appreciable detrimental chemical changes such as oxidation.

Suitable impregnants include vinyl resin, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids, esters and their polymerized derivatives, polyethylene, polystyrene, butadiene-styrene copolymer, butadiene-acrylonitrile copolymer, polymerized chloroprene, and similar synthetic rubber-like polymers, natural rubber, and the like are suitable. Thermosetting resins which under the influence of heat cure by polymerizing and/or crosslinking with the cellulose can also be used as impregnants. Such resins as phenolic resins, polyesters, oleoresins such as cured drying and semi-drying oils and the like, isocyanates and polyurethanes and the like are also useful.

These resins can be incorporated into the felted fibrous sheet by impregnation of the sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle.

It is sometimes desirable and particularly when the base is a felt sheet to apply a size coat prior to the application of the first coating. The size coat serves as a barrier coat to prevent migration of the felt impregnant into the coat. In addition, the size coat serves to provide good adhesion between the base sheet and the first coat. The size coat is preferably applied as an aqueous emulsion of a suitable resin although it can be applied as a plastisol or the like. Acrylic resins and vinyl chloride polymers have been found particularly useful for this purpose.

If the backing is to be removed from the final product, it is preferably a release paper. Such a paper conventionally has a coating on its surface to allow the plastic sheet to be easily stripped from the paper. Typical coatings used are clays, silicone compositions, polyvinyl alcohol, and similar special compositions well-known in the art.

In accordance with the invention, a foamable resinous polymer composition is applied to the base and, in some cases, a second layer of non-foamable resinous polymer composition is utilized. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogeneous consistency and uniform viscosity and rheological characteristics.

The foamable composition is also preferably a dispersion of resin in a liquid medium. The dispersion medium can be water in the case of an aqueous latex, organic solvent as an organosol or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferred since it is unnecessary to remove large volumes of carrier as is necessary with a latex or organosol. The composition can also be a mixture of dry blend and blowing agent. The dry blend is resin particles having plasticizer absorbed on their surface. The dry blend with the addition of stabilizer, pigments and the like can be mixed with the blowing agent and distributed on a base in a smooth layer. The layer is then heated to either form a porous sheet or to fuse partially or completely the composition into a solid sheet. The inhibitor can then be applied to the sheet thus formed in any suitable manner with the porous sheet modification, the penetration of the inhibitor is simplified because of the porous nature of the sheet. Such sheets are normally thereafter heated and subjected to a pressing operation to densify the sheet.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl esters such as vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethyl-butadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics, urea-formaldehydes; cellulose esters-epoxy; and silicones.

Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 35 microns. Dispersion grade resins are usually of higher molecular weight than calender grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective. (ASTM D1243–60.) Specific viscosity is a comparison of the flow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight.

In the formulation of plastisol compositions for use in the invention, the fine particle size resin is uniformly dispersed in a mass of fluid plasticizer. The fluidity of plastisols is influenced in part by the particular resin and plasticizers selected, but it is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 80 parts plasticizer per 100 parts resin being particularly effective. The viscosity of plastisol compositions can also be reduced by the addition of small amounts of a volatile diluent not exceeding about 10 parts per 100 parts resin. Useful diluents include benzene, toluene, methyl ethyl ketone, petroleum solvents such as V. M. and P. naphtha (boiling range of 190–275° F.) and the like. Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized.

The selection of the plasticizer is important in determining the strength and flexibility of the coating and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a compostiion of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

Minor amounts of stabilizers are usually incorporated in the coating compositions to reduce the effects of degradation by light and heat. Suitable light stabilizers include phenyl phthalate, phenyl benzoate, o-tolyl benzoate, o-nitrophenol, and organic phosphates and other complexes of such metals as barium, cadmium, calcium, zinc, strontium, lead, tin and the like. Suitable heat stabilizers include sulfides and sulfites of aluminum, silver, calcium, cadmium, magnesium, cerium, sodium, strontium, and the like, leucine, alanine, o- and p-amino benzoic acid and weak acid radicals including recinoleates and abietates, and the like. Normally, the compositions contain about 0.5 to about 5 parts stabilizer per 100 parts resin. The stabilizer in foamable compositions can exert influence on the decomposition of the blowing agent. Some stabilizers serve as catalyst causing the decomposition to take place at a lower temperature.

The coating compositions can contain pigments in accordance with the particular color desired. Any of the organic and inorganic pigments well known in the art for plastic compositions can be used. Normally, from about 0.5 to about 5 parts pigments per 100 parts resin are used.

The foamable compositions contain, in addition, an effective amount of blowing agent. The larger the amount of blowing agent within practical limits used, the greater is the expansion of the foam. Foam densities of from 12 to about 40 pounds per cubic foot can readily be obtained. Such results are attainable with from about 1 to about 20 parts blowing agent per 100 parts resin. About 2 to 10 parts blowing agent per 100 parts resin is particularly effective for the production of foams of a density which are most desirable for use in producing floor coverings in accordance with the invention.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield an inert gas and have residues which are compatible with the resin are preferred as blowing agents. Such materials have the property of decomposition over a narrow temperature range which is particularly desirable to obtain a good foam structure.

Typical types of blowing agent which can be mentioned include substituted nitroso compounds

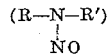

substituted hydrazides ($RSO_2NHNHR'$), substituted azo compounds ($R-N=N-R'$), acid azides ($R-CON_3$), guanyl compounds

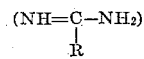

and the like wherein R and R' are hydrogen or hydrocarbon groups usually containing from one to ten carbon atoms.

The blowing agents which have found the most widespread use are those compounds having the

or $-N=N-$ linkages which decompose at elevated temperatures to yield an inert gas high in nitrogen. These compounds have the general formula

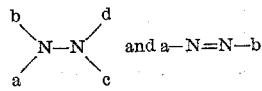

wherein a, b, c, and d are hydrocarbon groups, preferably containing up to ten carbon atoms, or hydrogen with at least one of the groups being a hydrocarbon group. Many of these hydrocarbon groups contain additional nitrogen groups such as hydrazide, amido, nitro, nitrile and the like. The presence of such groups is also desirable since they can readily react with the inhibitor to form derivatives having different decomposition temperatures.

Typical blowing agents with their decomposition temperature ranges are shown in Table I:

TABLE I

| Blowing agent: | Decomposition temperature ° F. |
|---|---|
| Azodicarbonamide ($NH_2\overset{O}{\overset{\|}{C}}N=N-\overset{O}{\overset{\|}{C}}-NH_2$) | 325–400 |
| p,p' Oxybis (benzene sulfonyl hydrazide) | 300–340 |
| p,p'-Oxybis (benzene sulfonyl semicarbazide) | 390–425 |
| Azobisisobutyronitrile | 215–250 |
| N,N'-dimethyl - N,N'-dinitrosoterephthalamide | 190–220 |
| Diazoaminobenzene | 212–266 |

Additional blowing agents which can be mentioned are N,N' - dinitrosopentamethylenetetramine, aminoguanidine bicarbonate, p,p'-thiobis (benzene sulphonhydrazide), p,p'-diphenylmethane disulphonhydrazide, benzene m-disulphonhydrazide, benzene sulphonhydrazide, terephthalazide, benzazide, p-tert.-butyl benzazide, phthalazide, isophthalazide, 1,3-diphenyltriazene, azohexahydrobenzonitrile, azo dicarboxylic acid diethyl ester, naphthalene-1,5-disulfonyl hydrazide and biuret.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing. In some instances, a combination of blowing agents can be used to advantage.

It is common practice to add accelerators or catalysts to the compositions to accelerate the decomposition of the blowing agents, reduce the decomposition temperature and/or narrow the decomposition temperature range. Typical types of accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercaptobenzothiazole, zinc octoate, zinc naphtholate, zinc dust, and cadmium octoate. These agents can also serve as stabilizers for the composition. Accelerators can be very effective for broadening the decomposition temperature differential between the inhibited blowing agent and the remaining blowing agent. In this specification and claims, the designation "blowing agent" is intended to include not only blowing agent itself, but also the combination of a blowing agent with an accelerator.

The foamable composition is formed into a film of the desired thickness and then heated to gel the composition to give a good printing surface for the application of the inhibitor. In this specification and claims, the term "gel" includes both the partial (at least the elastomeric point) and complete solvation of the resin or resins with the plasticizer (fused). The heating is limited as to the time and temperature to prevent the decomposition of the blowing agent in the composition. When using the preferred polyvinyl chloride composition, the temperature of the composition is preferably raised to about 240° F. to about 275° F. Generally, the actual oven temperature would be a slightly higher temperature to have the composition reach the desired temperature. If the foamable composition is to be formed into a self-supporting film, then the temperature would conventionally be high enough to fuse the composition.

The degree of foaming of a typical plastisol formulation using different concentrations of blowing agent is shown in the Table 2:

TABLE 2

| Parts Azodicarbonamide per 100 parts resin | Ratio of Foam Thickness to Original Thickness | Density (lbs. per cu. ft.) |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from about 10 to 30 pounds per cubic foot produces the most useful products.

Table 3 gives the preferred temperature and time relationship using the preferred polyvinyl chloride resin:

TABLE 3

| Film Condition* | Resin Temperature (° F.) | Oven Temperature (° F.) Circulating Air | Exposure Time (seconds) |
|---|---|---|---|
| Elastomeric Point | 240–300 | 250–400 | 10–30 |
| Fused | 340–375 | 350–450 | 60–240 |
| Blown | 340–400 | 350–450 | 60–240 |

*0.014 inch plastisol on 0.25 inch cellulosic felt base impregnated with 9 per cent vinyl acetate and 30 petroleum hydrocarbon. The sample was supported on a wire screen in the oven.

The time required to reach the elastomeric point will depend in part on the film thickness and particular base as shown in Table 4:

TABLE 4

| Base | Film Thickness (inch) | Time/Temperature (seconds/° F.) |
|---|---|---|
| A[1] | 0.008 | 45/300 |
| A[1] | 0.014 | 60/300 |
| B[2] | 0.014 | 90/300 |

[1] A cellulosic felt of 0.025 inch thickness impregnated with 25 percent vinyl acetate homopolymer.
[2] A cellulosic felt of 0.043 inch thickness containing 5 percent of a cured ureaformaldehyde resin and 25 percent of butadiene-acrylonitrile polymer.

While the foamable composition is described as being applied as a coating to the base, it is apparent that this composition can also be applied as a preformed sheet or the composition can be molded, extruded, calendered or otherwise formed into any desired shape depending on the ultimate use of the product.

The inhibitor for the blowing agent is applied to one surface of the resinous polymer composition in any desired design. The inhibitor is preferably applied in a liquid carrier which allows better control of the concentration of inhibitor applied. If the inhibitor is not soluble in the carrier, it can be dispersed with the carrier in the conventional paint-making technique to produce a fine dispersion. One of the easiest methods of applying the inhibitor-containing composition is by utilizing any of the conventional printing techniques, such as silk screen, off-set or direct rotogravure printing. As previously indicated, the inhibitor composition can be transparent or pigmented. It is conveniently formulated in the manner of a printing ink. Such compositions usually contain a carrier for the pigment, such as a vinyl resin, and, in some cases, a plasticizer for the resin to give good adhesion to the printing surface. The inhibitor for the blowing agent is an agent which alters the decomposition temperature of the blowing agent in the area of the foamable composition above or below where it is deposited. By varying the concentration of the inhibitor, the thickness of its application or its penetration (solubility or diffusibility) rate into the foamable composition, the degree of suppression or acceleration of the decomposition of the blowing agent can be controlled to produce foam layers of various heights or thicknesses. Unusually design effects can be obtained when the foamable composition is printed with a multicolored design wherein some of the ink compositions contain varying amounts of inhibitor and others do not contain any inhibitor.

The choice of an inhibitor for the blowing agent will depend on a number of factors. The most important are the particular blowing agent utilized in the system, the stabilizer and plasticizer in the composition and the fusion and decomposition temperature of the resin. Since all of these factors play a part, it is important to determine the suitability of any particular system by a simple test. The foamable composition to be tested is coated, or otherwise applied, on a base, heated to gel or partially harden the composition if this can be accomplished without decomposing the blowing agent. Spaced parallel lines of the test ink containing the inhibitor are then applied on the surface of the gelled coating in various concentrations, as for example, 5, 20, and 50 percent of the inhibitor. The sample is then carefully heated to fuse the composition and decompose the blowing agent in the areas desired. The effect of the particular inhibitor with the particular composition and conditions can readily be observed by viewing a cross-sectional cut of the sheet. As a general rule, it is desired to have at least 20° F. difference between the temperature at which the blowing agent will decompose and that at which the inhibited blowing agent will decompose. If a blowing agent is utilized that decomposes below the gel temperature of the composition, the inhibitor can be applied to the base and then the foamable composition applied over the inhibitor. Alternately, the inhibitor can be applied to the surface of the viscous foamable coating prior to heating.

The chemical composition of blowing agents varies widely and, therefore, the type of compound utilized as an inhibitor will vary. As indicated above, a simple test can be carried out to determine the usefulness of any particular compound. Compounds which have been found to be effective as inhibitors to alter the decomposition temperatures for blowing agents which contain the

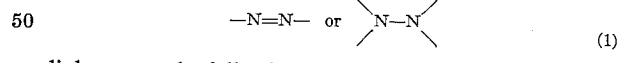 (1)

linkages are the following groups:

(1) Organic acids, and particularly such as maleic, fumaric, adipic, malic, 1,2-phthalic, salicylic, trimellitic, pyromellitic, malonic, citric, anthranilic, oxalic, formic, furoic, benzoic, 2,6-dihydroxybenzoic, sorbic, succinic, levulinic, stearic, myristic, trimesic, oleic, octanoic, o-nitrobenzoic, isosebacic and glutaric, trans-1,2-diaminocyclohexane tetraacetic acid monohydrate, 4-methoxybenzoic, dihydroxytartaric, o-aminobenzoic, m-aminobenzoic, p-aminobenzoic, 1-naphthoic, terephthalic, dl-mandelic, azelaic, nitrilotriacetic, trichloroacetic, barbituric, 2-pyridinecarboxylic, 2,3 - pyridinedicarboxylic, ascorbic acid, and abietic acid. As a general rule, the most useful acids are those having at least two carboxyl groups or those having at least one carboxyl group and one hydroxy group and which contain from 2 to 12 carbon atoms.

(2) Organic acid halides preferably which contain from 2 to 20 carbon atoms and particularly the chlorides such as trimellitic anhydride monoacid chloride, stearoyl chloride, phthaloyl chloride, benzoyl chloride, palmitoyl chloride, cinnamoyl chloride, fumaryl chloride, 1-naphthoyl chloride, terephthaloyl chloride, p-nitrobenzoyl chloride, 4-methoxybenzoyl chloride, isophthaloyl chloride, terephthaloyl chloride, trichloroacetyl chloride, bromoacetyl bromide, chloroacetyl chloride, phenylacetyl chloride, acetyl bromide, n-butyoyl chloride, propionyl chloride, iso-valeryl chloride, n-valeryl chloride, 2-bromopropionyl bromide, dichloroacetyl chloride, oxalyl chloride, lauroyl chloride, myristol chloride, palmitoyl chloride, succinyl chloride, hexanoyl chloride, hydrocinnamoyl chloride, adipyl chloride, iso-butyryl chloride, 4-methyl-n-valeryl chloride, crotonyl chloride, 2-chloropropionyl chloride, 2-phenoxypropionyl chloride, phenoxyacetyl chloride, propionyl bromide, iso-butyryl bromide, n-valeryl bromide, 2-bromo-2-methylpropionyl bromide, sebacyl chloride, cyclohexanecarbonyl chloride, ethyl oxalyl chloride, 10-undecenoyl chloride, undecanoyl chloride, benyoyl bromide, m-bromobenyoyl bromide, o-chlorobenzoyl chloride, anisoyl chloride, 2-furoyl chloride, 2-naphthoyl chloride, m-bromobenyoyl chloride, 2,4-dichlorobenyoyl chloride, p-phenylazobenyoyl chloride, and 1-intro-2-anthraquinonecarboxyl chloride.

(3) Organic acid anhydrides preferably those containing from 2 to 20 carbon atoms such as maleic, phthalic, succinic, pyromellitic dianhydride, citraconic, pyrotartaric, dodecenyl succinic, trimellitic, tetrahydrophthalic, tetrachlorophthalic, hexahydrophthalic, endocis-bicyclo [2.2.1] hept -5-end-2,3-dicarboxylic anhydride, 3,3', 4,4'-benzophenone tetracarboxyl dianhydride, 1,2:3,4-cyclopentanetetracarboxylic acid dianhydride, chlorendic anhydride, dichloromaleic anhydride, acetic anhydride, benzoic anhydride, chloroacetic anhydride, propionic anhydride, n-butyric anhydride, iso-butyric anhydride, n-valeric anhydride, hexanoic anhydride, n-heptanoic anhydride, citraconic anhydride, bicyclo (2,2,1)5-hept-ene-2,3-dicarboxylic anhydride, cis-4-cyclohexene-1,2-dicarboxylic anhydride, 7-oxabicyclo (2,2,1) heptane-2,3-dicarboxylic anhydride, maleo-pimaric acid anhydride, trifluoroacetic anhydride, pyrotartaric anhydride, glutaric anhydride, dichloroacetic anhydride, itaconic anhydride, 4-methyl-2-cyclohexane - 1,2 - dicarboxylic anhydride, tetrabromophthalic anhydride, 3-nitrophthalic anhydride, tetraiodophthalic anhydride, naphthalic anhydride, 5-norborene-2,3-dicarboxylic anydride, 3-chlorophthalic anhydride, 4-chlorophthalic anhydride, 4-methylphthalic anhydride, pyromellitic dianhydride.

(4) Polyhydroxy alcohols. The polyhydroxy aromatic compounds, which form a useful sub-class of alcohols, preferably contain two functional groups, and from 2 to 20 carbon atoms. Representative compounds include p-aminophenol, catechol, resorcinol, hydroquinone, pyrogallol, phloroglucinol, 4-tert-butyl-pyrocatechol, 2,5-ditertiary-butyl hydroquinone, p-benzoquinone, 1,8-dihydroxyanthraquinone, 2,3-naphthalenediol, 2,5-dichloro-3,6-dihydroxy-p-benzoquinone, 2,7-naphthalenediol, 1,3-naphthalenediol, 1,5-naphthalenediol, monotertiary-butyl hydroquinone, alizarin, purpurin, morin, o-hydroxybenzyl alcohol, α-nitroso-β-naphthol, and p-nitrobenzeneazo-α-naphthol. Aliphatic alcohols which can be used preferably contain at least two hydroxy groups and include mannitol, sorbitol, glycerol, ethylene glycol and diethylene glycol.

(5) Carbohydrates, such as d-maltose, d-galactose, d-glucose and fructose.

(6) Nitrogen containing compounds as amines, amides, oximes, and the like, such as ethanolamine, cyclohexylamine, benzylamine, piperazine, p-nitroaniline, acetoacetanilide, N,N'-disalicylidene-1,2-propane diamine, ethylenediamine, triethylenediamine, N,N-diethylaniline, α-benzoin oxime, dimethyl glyoxime, α-furil dioxime, diphenyl carbazone, salicylaldoxime, guanidine carbonate, triethylene tetramine, N-chlorosuccinimide, piperazine, 3,3'-imino-bispropylamine, p-phenylenediamine, nicotine, quinine, quinidine, 8-hydroxyquinoline, piperazine, 1,3-dichloro-5,5-dimethylhydantoin, imidazole, 1,10-phenanthroline monohydrate, p-nitrobenzene-azo-α-naphthol, 1-(2-pyridylazo)-2-naphthol, phthalic hydrazide, hydrazobenzene, p-toluene sulfonhydrazide and maleic acid hydrazide. Hexadecyltrimethyl ammonium stearate, hexadecylpyridinium chloride, 1-ethyl quinaldinium iodide. The amine is preferably a primary or secondary aliphatic mono- or polyamine. The aliphatic portion may contain an aromatic or cyclic grouping and be saturated or unsaturated. Cyclic compounds can, for example, have a 6 to 10 member ring and can have from 3 to 12 carbon atoms. Certain of the tertiary aliphatic amines also are useful amines.

(7) Sulphur containing compounds such as thiols or mercaptans, sulfides, sulfones, sulfoxides, sulfonic acids, sulfonyl chloride, sulfonamides, sulfimides and the like, as for example: 2-mercaptobenzothiazole, α,α'-dimercapto-p-xylene, mercaptosuccinic acid, 1-dodecanethiol, methanethiol lead salt, trimethylolpropane tris(3-mercaptopropionate), benzothiazyl disulfide, tetraethylthiuram disulfide, butadiene sulfone, glycol dimercaptoacetate, α-monothioglycerol, tetramethyl thiuram monosulfide, carboxy methylmercaptosuccinic acid, thiodiglycolic acid, tetramethyl thiuram disulfide, ethylene thiourea, thiourea, diphenylthiocarbazone, 1-cysteine, o-benzoic sulfimide, sym-diphenyl-thiourea, α-naphthalene sulfonic acid, 4,4'-biphenyldisulfonic acid, 2-naphthalenesulfonic acid, 1-butanesulfonic acid, m-benzenedisulfonic acid, thioacetamide, p-toluenesulfondichloroamide, 1-ethyl-2-phenyl-2-thiourea, 1,3-diethyl-2-thiourea, 1-phenyl-2-thiourea, 1,1,3,3-tetramethyl-2-thiourea, 2,5-dihydrothiophene-1,1-dioxide, p-toluenesulfonyl chloride, 2-naphthalenesulfonyl chloride, glyoxal sodium bisulfite, sodium dithionite, benzenethiol, 1-butanethiol, p-toluenethiol, 2-naphthalenethiol, ethanethiol, alpha-toluenethiol (benzyl mercaptan), 3-methyl-1-butanethiol, 1-propanethiol, methanethiol, 2-propanethiol, 1-heptanethiol, 2-methyl-propanethiol, mercapto-acetic acid (thioglycolic acid), 1-pentanethiol, glutathione, o-toluenethiol, m-toluenethiol, 1,2-ethanedithiol, o-mercaptobenzoic acid, 2-methyl-2-propanethiol, 2-mercapto-6-nitrobenzothiazole, 6-amino-2-mercaptobenzothiazole, 2-mercaptoethanol, ethyl mercaptoacetate, o-aminobenzenethiol, toluene-3,4-dithiol, 1-hexanethiol, 5-amino-2-benzimidazolethiol, 2-benzoxazolethiol, 3-mercaptopropionic acid, 1-dodecanethiol, 2-mercapto-acetanilide, 2-ethyl-1-hexanethiol, p-chlorobenzenethiol, methyl mercaptoacetate, 2,3-quinoxalinedithiol, 2-furanmethanethiol, 2-phenylethanethiol, p-tert-butylbenzenethiol, 1-octanethiol, 2-(phenylthio) quinoline, ethyl 2-mercaptoethyl carbonate, 4-mercaptobutyric acid, 2,3-dimercaptopropanol, 2,3-dihydroxy-1,4-dithiolbutane, isooctyl 3-mercaptopropionate, isooctyl thioglycolate, 1-thioglycerol, thiomalic acid, methoxymethyl thioglycolate, phenylmercaptoacetic acid, 2,9-para-menthanedithiol, β-mercaptoethyl-3-mercaptocyclohexane, β-mercaptoethyl-4-mercaptocyclohexane, 3-chloropropanethiol-1, pinanyl mercaptan, dithiolterephthalic acid, lauryl thioglycolate, stearyl thioglycolate, lauryl β-mercaptopropionate, stearyl β-mercaptopropionate, hydroxyethyl thioglycolate, hydroxyethyl β-mercaptopropionate, ethylene bis-mercaptoacetate, ethylene bis-β-mercaptopropionate, trimethylolethane tri-mercaptoacetate, trimethylolpropane tris-mercaptoacetate, pentaerythritol tetrakis-mercaptoacetate, pentaerythritol tetrakis-β-mercaptopropionate, 31 organotin sulfur, dibutyl tin mercaptopropionate, dibutyl tin bis-(laurylmercaptide), alkyl tin mercaptide, and benzyl thiouronium chloride.

(8) Isocyanates such as 2,4-tolyene diisocyanate, p,p'-diphenylmethane diisocyanate, bitolyene diisocyanate, methylene bis(4-phenyl isocyanate), dianisidine diisocyanate, phenyl isocyanate, 1-naphthyl isocyanate, p-tolyl isocyanate, p-nitrocyanate, 1-naphthyl isocyanate, p-tolyl isocyanate, p-nitrophenyl isocyanate, 2-naphthyl isocyanate, m-tolyl isocyanate, o-tolyl isocyanate, p-ethoxylphenyl isocyanate, p-bromophenyl isocyanate, o-chlorophenyl isocyanate, m-chlorophenyl isocyanate, p-chlorophenyl isocyanate, 2,5-dichlorophenyl isocyanate, o-ethoxyphenyl isocyanate, o-nitrophenyl isocyanate, 2-biphenylyl isocyanate, m-nitrophenyl isocyanate, 4-biphenylyl isocyanate, o-methoxyphenyl isocyanate, p-methoxyphenyl isocyanate, p-methoxyphenyl isocyanate, tolylene-2,4-diisocyanate, m-xylylene diisocyanate, p-xylylene diisocyanate, methylene-di-p-phenyl diisocyanate and p-phenylazophenyl isocyanate.

(9) Ketones and aldehydes such as cyclohexanone, acetylacetone, 1,3-diphenyl-1,3-propanedione, 1-phenyl-1,3-butanedione, and glyoxal. Preferred compounds within this class will contain two functional groups, i.e., polyketones or polyaldehydes.

(10) Phosphate and phosphite compounds such as n-butyl acid phosphate, diamyl amyl phosphonate, trilauryl trithiophosphite, and phenylneopentyl phosphite.

(11) Other interesting compounds which exert inhibiting qualities are 6,6-dimethyl fulvene, hexachlorocyclopentadiene, 2,4-dinitrophenol, n-hexyl chloroformate, p-nitrobenzyl chloroformate, dibutyl tin maleate and positive chlorine compounds such as dichloroisocyanuric acid, trichloroisocyanuricic acid, potassium dichloroisocyanurate, N-chloro-p-benzoquinone imine, dichloroamine, and halane. Some of these latter compounds are contained in the above groups.

When blowing agents are utilized having a reducible bond such as an azo group, a reducing agent is a particularly effective inhibitor. Typical reducing agents are hydroquinone, polyhydroxyaromatic compounds, phenylenediamines, hydrazobenzenes, alkali metal dithionite, mercaptans such as $\alpha, \alpha'$-dimercapto-p-xylene and mercaptosuccinic acid, and the reducing sugars.

As indicated previously, some of the inhibitor causes the contacted areas to be raised above the remaining layer by lowering the decomposition temperature of the blowing agent. In some instances, if the foam layer is heated to a higher temperature, this increased decomposition can also cause the areas to collapse from being overblown. Such a collapsed product can have substantially the same appearance as if the decomposition of the blowing agent was prevented.

The inhibitors will not be useful for all types of blowing agents. Aminoguanidine bicarbonate is best inhibited with anhydrides such as maleic and trimellitic; N,N'-dimethyl-N,N'-dinitroso-terephthalamide is inhibited by similar anhydrides and chlorides such as terephthaloyl chloride. p,p'-oxybis (benzene sulfonyl hydrazide) is inhibited particularly effectively by trimellitic anhydride, terephthaloyl chloride, fumaric acid and hydroquinone. Diazominobenzene is inhibited by maleic and trimellitic anhydride and p,p'-oxybis (benzene sulfonyl semicarbazide) is inhibited with maleic and trimellitic anhydride, fumaric acid and terephthaloyl chloride. It is interesting to note that inhibitors such as these catalyze the decomposition of N,N'-dinitrosopentamethylene tetramine resulting in raised areas when these inhibitors are applied. Care must be exercised in selecting the inhibitor to produce the desired results.

The inhibitor produces a differential in the amount of expansion of the contacted areas as compared to the other areas when the heating of the composition is controlled to permit the differential expansion. This results from a lowering or raising of the decomposition temperature of the contacted blowing agent. The portions of the resinous composition layer on which the inhibitor is applied will be higher or lower, because of this differential decomposition of the blowing agent. The chemical mechanism involved is not known. It appears, however, that there are competing reactions since the inhibitor can react with the functional group or groups on the blowing agent to form a compound or complex having a decomposition temperature different from the blowing agent itself and it can also interfere with action of the accelerator. Control of the concentration of the inhibitor can have a material effect on which reaction path is taken. It appears that low concentration will interfere with the action of the accelerator whereas higher concentration causes reaction with the blowing agent itself. The acid and acid anhydride inhibitors, for example, are believed to function in this manner. In the use of a reducing agent, the azo group in the blowing agent may be reduced with hydrogen or a hydrocarbon radical. It is believed that the metal accelerators function to reduce the decomposition temperature of the blowing agent by causing the hydrolysis of the amide group in such blowing agent as azobisformamide to form the corresponding salt. The inhibitor may slow down or stop this hydrolysis. Alternately, the inhibitor can function as a catalyst or activator in changing the decomposition temperature of the blowing agent. Another method is to utilize as the blowing agent in the resinous composition a mixture of a blowing agent and an inhibitor or the compound formed by such a combination. A second inhibitor which will react or interfere with the first inhibitor is applied to the surface of such a composition to cause the first inhibitor to be unavailable to the blowing agent which will then revert to its original decomposition temperature. A typical illustration of such a combination would be the use of an acid as one inhibitor and a base as the other inhibitor. The inhibitor can also form a compound with the accelerator utilized to prevent its availability to lower the decomposition temperature of the blowing agent. As an illustration, when using lead as an accelerator, the addition of a chloride ion donor causes the formation of a lead salt which prevents the lead from serving as an accelerator. It has been found that certain chelating agents will chelate metal accelerators and thereby remove them from the system.

It is essential to cause the composition in the areas of application of inhibitor to have a decomposition temperature which is sufficiently different from that of the remaining areas of the composition to allow differential expansion. The fusion temperature of the polymer composition, therefore, fixes the temperature range in which it is necessary to operate to obtain differential decomposition.

The selection of a particular foamable composition and inhibitor can be aided by plotting a curve of the temperature vs. the volume of gas given off by the blowing agent. This measurement can be made by simply causing the gas given off to replace a liquid such as water and measuring the displacement at the various temperatures. Such curves are shown in FIGURE 14 with the gas evolved displacing water and correction was made for any gas given off by the components utilized other than the blowing agent. The compositions utilized in plotting the curves of FIGURE 14 are shown in Table 5 and consists of the components in the amounts indicated in 400 cc. of dioctyl phthalate.

TABLE 5

Curve on FIGURE 14:            Composition utilized

A ____ 2.0 g. azodicarbonamide and 4.2 g. dibasic lead phosphite.
B ____ 2.0 g. azodicarbonamide, 4.2 g. dibasic lead phosphite and 4.1 g. benzylamine.
C ____ 2.0 g. azodicarbonamide, 4.2 g. dibasic lead phosphite and 7.3 g. trimellitic anhydride.
D ____ 2.0 g. azodicarbonamide and 7.3 g. trimellitic anhydride.
E ____ 2.0 g. azodicarbonamide, 4.2 g. dibasic lead phosphite and 4.4 g. fumaric acid.
F ____ 2.0 g. azodicarbonamide and 4.4 g. fumaric acid.
G ____ 2.0 g. azodicarbonamide and 4.1 g. benzylamine.
H ____ 2.0 g. azodicarbonamide.
I ____ 2.0 g. azodicarbonamide and 4.2 g. hydroquinone.
J ____ 2.0 g. azodicarbonamide, 4.2 g. hydroquinone and 4.2 g. dibasic lead phosphite.

It should be understood that the decomposition temperature of the various blowing agents and combinations can be effected by other components in the foamable compositions and/or inks and, therefore, the particular system selected has to be tested. In FIGURE 14, it can be seen that the composition of Curve A has the lowest decomposition temperature and, therefore, any of the inhibitors utilized to form Curves B, C, D, E, F, G, I and J can be utilized to raise the decomposition temperature of a foamable composition containing the components of Composition A. The decomposition temperature of the composition of Curve B, however, is very close to A, which would require careful heating to obtain differential decomposition. If the foamable composition contains the composition of Curve H, it is apparent that the inhibitor used in the compositions to form Curves B, C, D, E, F and G would result in accelerating the decomposition of the blowing agent in the areas contacted by the inhibitor, whereas the inhibitors of Curves I and J would prevent the decomposition in the areas contacted. As can also be seen, the presence of an accelerator, such as dibasic lead phosphite to lower the decomposition temperature of the blowing agent, alters the position of the curve and makes the combination decompose below the decomposition temperature of many of the inhibitors and blowing agent combinations. In selecting any inhibitor, care must be exercised in that the inhibitor should not volatize or decompose at operating conditions so that it will be lost and, therefore, unavailable to inhibit.

The ability of the inhibitor to prevent or accelerate the decomposition of the blowing agents when applied only to the surface of the foamable composition is not understood. The solubility of the inhibitor in the foamable composition at the decomposition temperature is a definite factor in the process. When utilizing inhibitors which are readily soluble, the amount of inhibitor and the percentage concentration of inhibitor have a marked effect on the degree of inhibition. The insoluble, or slightly soluble, inhibitors can be finely ground as in the nature of pigment which makes them either readily soluble or diffusible at operating temperatures.

The amount of material utilized in the ink will determine in large measure the degree of foam inhibition. Particularly good results have been obtained with from 5 to about 75 percent of the inhibitor. Some of the inhibitors leave a slight colored stain which can be overcome, in most instances, by pigmentation. The inhibiting action of some of the agents is greatly increased if a resinous coating is placed over the inhibitor prior to decomposition of the blowing agent. Apparently, the coating prevents the evaporation or decomposition of the inhibitor by the high heat. When utilizing a two-layer system with the application of the inhibitor between the layers, the inhibitor will migrate into both layers. The efficiency of the system can be improved by placing a barrier coat over the inhibitor, such as an acrylic resin coating, to prevent migration of the inhibitor in both directions.

After the printing step or application of the inhibitor, a second layer of resinous composition can be applied and, as indicated above, in some cases it is desirable. The second coating, as indicated above, can be the same or different composition from the first coating. If different compositions are used which are not readily compatible, an adhesive layer can be applied before the second coating. In the event that a decoration has been printed on the surface of the first coating, it is necessary for the second coating to be of transparent or translucent composition so that the printed design can be visible through the second coating. This second coating can serve as a wear layer and, therefore, its thickness will depend on how much wear is desired in the final product. As a general rule, a coating of from about 2 to about 25 mils is sufficient to give the product good wearing qualities. As previously indicated, the application of the second coating can be omitted altogether or it can be made after the foamable composition has been foamed and fused.

In some instances, it may be desirable to produce the embossed effect prior to the application of the wear layer. If a smooth surface is desired for applying the wear layer, an inhibitor which causes the blowing agent to decompose at a very low temperature can be used to advantage. As an illustration, a foamable composition containing azodicarbonamide as the blowing agent can be heated to gel the composition without fusing. The gelled sheet is then printed with a design with some of the inks containing oxalic acid as the inhibitor. The sheet can then be preheated to cause the decomposition of the blowing agent contacted by the oxalic acid. Because of the weak condition of the foamable composition, the gas generated by the decomposition will pass completely out of the gelled layer. The wear layer is applied and then the product heated in the conventional manner to decompose the blowing agent. The areas where the gas generated was released in the preheating will be depressed below the surface of the product.

The foamable composition is heated to a temperature sufficient to fuse the resin by completely solvating the resin with plasticizer and to decompose the blowing agent. The temperature of the entire mass of composition upon the backing must attain the fusion temperature of the resin in order to obtain a product of maximum strength. Using the preferred vinyl resin, fusion is attained at a temperature of about 300° F. to about 375° F. In addition, the entire mass of foamable composition must be heated to a point where the blowing agent is decomposed. When the preferred high temperature blowing agent is used, foaming does not occur until the resinous composition has been fused. The heating must be carried out, however, at a temperature which allows decomposition of the blowing agent only in the areas desired.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if 5 percent of V.M.&P. naphtha (boiling range 190–275° F.) is used, heating at 200° F. for 5 minutes will remove sufficient material so that fusion and blowing at 400° F. can be accomplished with good cell structure and freedom from blisters.

Heating in order to effect fusion and foaming can be brought about in a forced hot air oven; however, other types of heating can be used. For example, the product can be passed beneath radiant heating elements; alternately, di-electric heating can be used.

The foamed and fused product after leaving the heating oven is permitted to cool. Cooling is particularly important since any premature handling of the product immediately after foaming might cause partial collapse and distortion of the foam structure. Cooling can be brought about by mere exposure of the product to the atmosphere; thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent resilience, depending in part on the thickness of the foam layer. They are also characterized by having a marked three-dimensional textured appearance in perfect register with a printed design, if desired. Still further, the products of the invention have good heat insulating properties by virtue of the layer of foamed composition and thus are warmer in winter than conventional resinous surface coverings.

As can be seen by reference to FIGURE 7, in one embodiment of the invention, the number of cells formed by the blowing agent is approximately the same in the depressed areas as in the raised areas. The difference is in the cell size which in the depressed areas is substantially smaller. This can be due to the substantially complete decomposition of the blowing agent as compared to only partial decomposition in the depressed areas. Such a result occurs since the blowing agent decomposes over a temperature range rather than at a precise temperature as illustrated by FIGURE 14. The amount of decomposition is also a function of time. As a general rule, with most inhibitors, the decomposition temperature range of the blowing agent and inhibited blowing agent will overlap. As indicated above, it is preferred to have a difference in decomposition temperature (temperature of maximum gas release) of at least 20° F. and preferably as much as 50° F. The time required, however, to obtain maximum decomposition of the uninhibited blowing agent can cause some decomposition of the inhibited blowing agent thereby producing the smaller cell size as shown in FIGURE 7. As is apparent, care must be exercised in the heating operation to permit this desired difference in decomposition to produce the product having the different levels of embossing. As a general rule, the higher the decomposition temperature of the inhibited blowing agent, the wider the range of temperatures which can be utilized. Most of the preferred vinyl resins start to degrade at temperatures of about 400° F. and, therefore, operation of the process must take place below this temperature or not above such a temperature for any significant length of time.

As indicated above, the foamable composition can be first formed into a self-supporting sheet or other shape before decomposition of the blowing agent. A typical method for forming a calendered preformed sheet is disclosed in U.S. Patent 2,964,799, issued Dec. 20, 1960 to P. E. Roggi et al. In accordance with the disclosure in this patent, a high temperature blowing agent such as azodicarbonamide (1,1'-azobisformamide) is utilized. The resinous composition is mixed in a Banbury mixer or the like to fuse the composition and the fused composition is then passed through calender rolls to form a sheet of the desired thickness. This sheet can be self-supporting and, in accordance with the present invention, is passed to a printing station or the like which applied the chemical inhibitor to one or both surfaces in the desired areas. The sheet is then heated to decompose the blowing agent which is not in contact with the inhibitor thereby producing a product having a surface at various levels corresponding to the degree of decomposition of the blowing agent. The sheet can be laminated to a backing or wear layer prior to or after the decomposition of the blowing agent. As indicated, the same procedure can be used to form various shapes by substituting for the calender, an extruder, press, mold or other type of forming apparatus.

This invention can also be utilized to produce products having an embossed surface and only a very thin cellular foam layer which does not impart any properties of the foam layer to the final product. As an illustration, a floor covering product widely sold is produced by coating a felt or resinous sheet with a pigmented coating, printing a design on the coating, applying a transparent resinous coating over the printing, heating to fuse the coatings, and then embossing the surface of the product by passing between embossing rolls. This same type of product having the embossed areas in register with the printed design can be prepared by substituting a thin layer of foamable composition for the pigmented coatings and utilizing as at least one of the ink compositions an inhibitor composition. After the foamable composition is applied to the base, it is heated to gel the composition and then the design printed on the surface of the gelled surface. During the fusion operation, the blowing agent decomposes. The areas in contact with the inhibitor will be depressed and these depressions are mirrored in the surface of the product. By utilizing a very thin foam layer, its presence is not apparent in the final product. Such a system eliminates the need for embossing rolls and presents a simple method of having the embossed areas in register with the printed design.

The products of this invention can find wide use. They make excellent floor, wall and countertop coverings. Additionally, the products make excellent upholstery material, drapes and curtains enabling the production of a wide range of effects. Further, the process offers an excellent method of decorating objects such as bottles, cans, books, displays and the like. Many additional applications of this invention will occur to those skilled in the art.

The following examples are given for purposes of illustration:

*Example 1*

A foamable plastisol was formulated by mixing the following ingredients on a Cowles mixer:

| | Parts |
|---|---|
| Polyvinyl chloride (dispersion grade, specific viscosity 0.60) | 50 |
| Polyvinyl chloride (dispersion grade, specific viscosity 0.40) | 50 |
| Butyl benzyl phthalate | 25 |
| Di(2-ethylhexyl) phthalate | 45 |
| Titanium dioxide | 7 |
| Azodicarbonamide | 3 |
| V. M. & P. naphtha (boiling range 190–275° F.) | 5 |

*Example 2*

A foamable plastisol was formulated by grinding the following ingredients on a three-roll mill:

| | Parts |
|---|---|
| Polyvinyl chloride (dispersion grade, specific viscosity 0.60) | 50 |
| Polyvinyl chloride (dispersion grade, specific viscosity 0.40) | 50 |
| Alkyl aryl modified phthalate ester (plasticizer) | 55 |
| Alkyl aryl hydrocarbon (secondary plasticizer) | 10 |
| Dibasic lead phosphite (stabilizer) | 1.5 |
| Titanium dioxide (pigment) | 5 |
| Azodicarbonamide (blowing agent) | 2.5 |

This plastisol, upon heating to decompose the blowing agent, resulted in a thickness of 4.5 times the unblown thickness.

*Example 3*

A foamable plastisol was formulated by mixing the following ingredients:

| | Parts |
|---|---|
| Polyvinyl chloride (dispersion grade, specific viscosity 0.60) | 35 |
| Polyvinyl chloride (dispersion grade, specific viscosity 0.40) | 35 |
| Polyvinyl chloride (suspension grade, specific viscosity 0.35) | 30 |
| Alkyl aryl modified phthalate ester (plasticizer) | 55 |
| Alkyl aryl hydrocarbon (secondary plasticizer) | 10 |
| Dibasic lead phosphite | 1.0 |
| Titanium dioxide | 5.0 |
| Azodicarbonamide | 1.7 |

The plastisol, upon heating to decompose the blowing agent, resulted in a thickness of 2.5 times the unblown thickness.

Example 4

A foamable plastisol was formulated by mixing the following ingredients:

| | Parts |
|---|---|
| Polyvinyl chloride (dispersion grade, specific viscosity 0.60) | 100 |
| Di(2-ethylhexyl) phthalate (plasticizer) | 60 |
| Alkyl aryl hydrocarbon (secondary plasticizer) | 5 |
| Dibasic lead phosphite | 1.0 |
| Titanium dioxide | 2.0 |
| Azodicarbonamide | 3.0 |

The plastisol, upon heating to decompose the blowing agent, resulted in a thickness of 5.5 times the unblown thickness.

Example 5

The following ingredients in the proportions indicated were mixed to form a foamable plastisol:

| | Parts |
|---|---|
| Polyvinyl chloride (dispersion grade, specific viscosity 0.60, high molecular weight) | 34 |
| Polyvinyl chloride (dispersion grade, medium molecular weight) | 34 |
| Polyvinyl chloride (large particle size blending resin) | 32 |
| Polymeric plasticizer (dibasic acid glycol) | 70 |
| Stabilizer | 1.3 |
| Pigment | 3 |
| N,N'-dimethyl-N,N'-dinitroso terephthalamide blowing agent | 5 |

Example 6

A foamable plastisol was prepared having the following composition:

| | Parts |
|---|---|
| Polyvinyl chloride (low molecular weight) | 100 |
| Dioctyl phthalate | 90 |
| Dibasic lead phosphite | 2 |
| 4,4'-Oxybis (benzene sulfonyl hydraxide) | 6 |

Example 7

A foamable plastisol was prepared having the following composition:

| | Parts |
|---|---|
| Polyvinyl chloride (high molecular weight) | 100 |
| Dioctyl phthalate | 80 |
| Dibasic lead phosphite | 2 |
| p,p'-Oxybis (benzene sulfonyl semicarbazide) | 5 |

Example 8

A foamable plastisol was prepared having the following composition:

| | Parts |
|---|---|
| Polyvinyl chloride (high molecular weight) | 100 |
| Dioctyl phthalate | 100 |
| Dibasic lead phosphite | 5 |
| N,N'-dimethyl-N,N'-dinitroso-terephthalamide | 10 |

Example 9

A foamable plastisol was prepared having the following composition:

| | Parts |
|---|---|
| Polyvinyl chloride (dispersion grade, specific viscosity 0.40, low molecular weight) | 100 |
| Dioctyl phthalate | 75 |
| Dibasic lead phosphite | 2 |
| Diazoaminobenzene | 5 |

Example 10

A foamable plastisol was prepared having the following composition:

| | Parts |
|---|---|
| Polyvinyl chloride (low molecular weight) | 50 |
| Polyvinyl chloride (high molecular weight) | 50 |
| Dioctyl phthalate | 100 |
| Dibasic lead phosphite | 2 |
| Aminoguanidine bicarbonate | 5 |

Example 11

A foamable plastisol was prepared having the following composition:

| | Parts |
|---|---|
| Polyvinyl chloride (dispersion grade, specific viscosity 0.60) | 50 |
| Polyvinyl chloride (dispersion grade, specific viscosity 0.40) | 50 |
| Butyl benzyl phthalate | 52 |
| Alkyl aryl hydrocarbon (secondary plasticizer) | 18 |
| Azodicarbonamide | 3.0 |
| Dibasic lead phosphite | 2.0 |
| Pigment ($TiO_2$) | 5.0 |
| V. M. & P. naphtha (boiling range 190–275° F.) | 5 |

Examples 12 to 15 are typical wear layer compositions.

Example 12

The following ingredients in the proportions indicated were mixed:

| | Parts |
|---|---|
| Polyvinyl chloride (dispersion grade, specific viscosity 0.50) | 100 |
| Dioctyl phthalate | 17 |
| Tricresyl phosphate | 8.5 |
| Epoxidized soya oil | 8.5 |
| Stabilizer | 2.0 |
| V. M. & P. naphtha (boiling range 190–275° F.) | 18.0 |
| Methyl ethyl ketone | 2.0 |

Example 13

The following ingredients in the proportions indicated were mixed:

| | Parts |
|---|---|
| Polyvinyl chloride (dispersion grade, specific viscosity 0.50) | 100 |
| Alkyl aryl modified phthalate ester (plasticizer) | 38 |
| Epoxidized tall oil ester (secondary plasticizer) | 5 |
| 2,2,4-trimethyl-1,3-pentanediol diisobutyrate | 7 |
| Stabilizer | 3 |
| Viscosity depressant | 1.2 |
| V. M. & P. naphtha (boiling range 190–275° F.) | 15.0 |

Example 14

The following ingredients in the proportions indicated were mixed:

| | Parts |
|---|---|
| Polyvinyl chloride (dispersion grade, specific viscosity 0.50) | 95 |
| Polyvinyl chloride (suspension grade, specific viscosity 0.35) | 5 |
| Alkyl aryl modified phthalate ester (pasticizer) | 38 |
| Epoxidized tall oil ester (secondary plasticizer) | 5 |
| 2,2,4-trimethyl-1,3-pentanediol diisobutyrate (secondary plasticizer) | 7 |
| Stabilizer | 3 |
| Viscosity depressant | 0.3 |
| V. M. & P. naptha (boiling range 190–275° F.) | 2.0 |

Example 15

The following ingredients in the proportions indicated were mixed:

| | Parts |
|---|---|
| Polyvinyl chloride (dispersion grade, specific viscosity 0.50) | 50 |
| Polyvinyl chloride (dispersion grade, specific viscosity 0.40) | 50 |
| Alkyl aryl modified phthalate ester (plasticizer) | 45 |
| Alkyl aryl hydrocarbon (secondary plasticizer) | 5 |
| Stabilizer | 3 |
| Viscosity depressant | 1 |
| Titanium dioxide | 5 |
| V. M. & P. naphtha (boiling range 190–275° F.) | 2 |

Example 16

A size coat is prepared having the following formulation:

| | Parts |
|---|---|
| Polyvinyl chloride latex (preplasticized) | 53 |
| Carboxy vinyl polymer (thickener 2% in water) | 35 |
| Water | 12 |

Ammonia to raise pH to 7–8.

Example 17

A size coat is prepared having the following composition:

| | Parts |
|---|---|
| Acrylic resin (soft) | 50 |
| Acrylic resin (hard) | 50 |
| Water | 100 |

Examples 18 to 36 are typical printing compositions prepared by mixing the ingredients together.

Example 18

| | Parts |
|---|---|
| Polyvinyl chloride | 12.1 |
| Tricresyl phosphate | 6.5 |
| Methyl ethyl ketone | 81.4 |
| Pigment | 15.0 |
| Inhibitor | 10.0 |

Example 19

| | Parts |
|---|---|
| Polyvinyl chloride | 8.3 |
| Pigments | 18.0 |
| Polypropylene glycol sebacate | 14.5 |
| Methyl ethyl ketone | 44.3 |
| Cyclohexanone | 14.9 |
| Inhibitor | 20.0 |

Example 20

| | Parts |
|---|---|
| Vinyl chloride-vinyl acetate copolymer | 12.2 |
| Pigments | 11.1 |
| Tricresyl phosphate | 15.7 |
| Methyl ethyl ketone | 61.0 |
| Inhibitor | 15.0 |

Example 21

| | Parts |
|---|---|
| Vinyl chloride-vinyl acetate copolymer | 8.5 |
| Methyl ethyl ketone | 54.0 |
| TiO$_2$ (55%) | 25.0 |
| Hydroquinone | 12.5 |

Example 22

| | Parts |
|---|---|
| Vinyl chloride-vinyl acetate copolymer | 8.5 |
| Methyl ethyl ketone | 54.0 |
| TiO$_2$ (55%) | 25.0 |
| Maleic anhydride | 12.5 |

Example 23

| | Parts |
|---|---|
| Vinyl chloride-vinyl acetate copolymer | 7.5 |
| Methyl ethyl ketone | 47.5 |
| TiO$_2$ (55%) | 25.0 |
| Fumaric acid (62.5% in dioctyl phthalate) | 20.0 |

Example 24

| | Parts |
|---|---|
| Vinyl chloride-vinyl acetate copolymer | 8.5 |
| Methyl ethyl ketone | 54.0 |
| TiO$_2$ (55%) | 25.0 |
| Trimellitic anhydride | 12.5 |

Example 25

| | Parts |
|---|---|
| Vinyl chloride-vinyl acetate copolymer | 8.5 |
| Methyl ethyl ketone | 54.0 |
| TiO$_2$ (55%) | 25.0 |
| Terephthaloyl chloride | 12.5 |

Example 26

| | Parts |
|---|---|
| Vinyl chloride-vinyl acetate copolymer | 8.5 |
| Methyl ethyl ketone | 54.0 |
| TiO$_2$ (55%) | 25.0 |
| Tetrachlorophthalic anhydride | 12.5 |

Example 27

| | Parts |
|---|---|
| Vinyl chloride-vinyl acetate copolymer | 8.5 |
| Methyl ethyl ketone | 54.0 |
| TiO$_2$ (55%) | 25.0 |
| Hexahydrophthalic anhydride | 12.5 |

Example 28

| | Parts |
|---|---|
| Vinyl chloride-vinyl acetate copolymer | 8.5 |
| Methyl ethyl ketone | 54.0 |
| TiO$_2$ (55%) | 25.0 |
| Tetrahydrophthalic anhydride | 12.5 |

Example 29

| | Parts |
|---|---|
| Vinyl chloride-vinyl acetate copolymer | 8.5 |
| Methyl ethyl ketone | 54.0 |
| TiO$_2$ (55%) | 25.0 |
| Phthalic anhydride | 12.5 |

Example 30

| | Parts |
|---|---|
| Vinyl chloride-vinyl acetate copolymer | 8.5 |
| Methyl ethyl ketone | 54.0 |
| TiO$_2$ (55%) | 25.0 |
| Chlorendic anhydride | 12.5 |

Example 31

| | Parts |
|---|---|
| Vinyl chloride-vinyl acetate copolymer | 8.5 |
| Methyl ethyl ketone | 54.0 |
| TiO$_2$ (55%) | 25.0 |
| 3,3',4,4' - benzophenone tetracarboxylic dianhydride | 12.5 |

Example 32

| | Parts |
|---|---|
| Vinyl chloride-vinyl acetate copolymer | 8.5 |
| Methyl ethyl ketone | 54.0 |
| TiO$_2$ (55%) | 25.0 |
| Mercaptobenzothiazole | 12.5 |

Example 33

| | Parts |
|---|---|
| Vinyl chloride-vinyl acetate copolymer | 8.5 |
| Methyl ethyl ketone | 54.0 |
| TiO$_2$ (55%) | 25.0 |
| Trimellitic anhydride mono acid chloride | 12.5 |

Example 34

| | Parts |
|---|---|
| Vinyl chloride-vinyl acetate copolymer | 8.5 |
| Methyl ethyl ketone | 54.0 |
| TiO$_2$ (55%) | 25.0 |
| Acetoacetanilide | 12.5 |

Example 35

| | Parts |
|---|---|
| Vinyl chloride-vinyl acetate copolymer | 8.5 |
| Methyl ethyl ketone | 54.0 |
| TiO$_2$ (55%) | 25.0 |
| Benzylamine | 12.5 |

Example 36

| | Parts |
|---|---|
| Vinyl chloride-vinyl acetate copolymer | 8.5 |
| Methyl ethyl ketone | 54.0 |
| TiO$_2$ (55%) | 25.0 |
| Oxalic acid | 12.5 |

Example 37

The plastisol of Example 2 is applied as a uniform coating of about 0.009 inch in thickness on the surface of a release paper. The release paper has a coating of a complex compound of the Werner type in which a trivalent nuclear chromium atom is coordinated with an acrylic carboxylic acido group having at least 10 carbon atoms. Such a composition is disclosed in United States Patent 2,273,040, issued Feb. 17, 1942. The plastisol coating is then heated to a temperature of 275° F. to gel the composition. The gelled coating is then cooled. The cooled gelled product is then passed through a rotogravure press which prints a five-color design on the surface of the gelled coating. Some of the printing composition applied had the formula of Example 22 wherein the inhibitor was maleic anhydride. The remaining printing composition did not contain an inhibitor. The organosol composition of Example 12 was then coated on the surface of the printed, gelled coating to form a uniform coating of 0.005 inch in thickness. The coatings were then heated to a temperature of 375° F. to fuse the compositions and completely decompose the blowing agent to form a foam layer of 0.040 inch thickness integrally bonded to the wear layer of 0.005 inch thickness. The fused and foamed product was then cooled and the release paper stripped from the back of the product. The resulting product has a foam underlayer with a solid resinous wear layer integrally bonded thereto. The product had depressions in its surface corresponding to the places where the ink containing the inhibitor was applied. The depressions were about 0.020 inch in depth.

*Example 38*

The procedure of Example 37 was generally followed, except that the design was first printed on the surface of the release paper prior to application of the foamable plastisol composition. Only the portions of the design containing the inhibitor were printed. The resulting product was identical to that of Example 37 in the depressed areas of the sheet, but it did not have a printed design between the foam layer and the wear layer.

*Example 39*

The procedure of Example 37 was generally followed, except that the printing of the design on the gelled foamable coating was omitted. After the transparent plastisol composition of Example 12 was applied to the surface, it was heated to a temperature of 300 F. to gel the composition. The design was then printed on the gelled transparent coating as described in Example 37 and the printed sheet was then heated for three minutes at 300° F. to increase the penetration of the inhibitor into the foamable layer. The entire sheet was then heated to 375° F. to cause fusion of the coating composition and decomposition of the blowing agent. The resulting product, after cooling, had the same appearance as the product of Example 37 in having depressed areas in the surface to give the product an embossed appearance, except that the design was on the surface of the product. During the heating to decompose the blowing agent, the inhibitor had migrated through the plastisol coating and inhibited the decomposition of the blowing agent in the foamable layer beneath.

*Example 40*

A design was printed on the surface of a thin sheet of release paper having a coating of polyvinyl alcohol. Some of the inks utilized to print the design had the composition of Example 24. The printed release paper was then placed in the bottom of a mold and the foamable plastisol composition of Example 2 poured in the mold covering the release paper. The composition was then heated to fuse the resin, the fused composition was then removed from the mold and further heated to decompose the blowing agent. After cooling, the release paper was removed from the foamed plastisol. The foamed product had the design on its surface and portions of the design were depressed below the surface of the product. These depressed portions corresponded to the inks containing the composition of Example 24.

*Example 41*

The plastisol of Example 3 was applied as a uniform coating of 0.012 inch on the surface of a 0.025 inch thick cellulose felt sheet impregnated with 20 percent polyvinyl acetate. The felt sheet had previously been coated with the size coating of Example 16 at the rate of 0.025 pound per square yard and dried. The plastisol coating was then heated to a temperature at 310° F. for a period of 50 seconds to obtain a composition temperature of about 300° F. thereby gelling the coating into a film having an elongation of 100 percent. The gelled sheet was then passed through a rotogravure press which applied a design to its surface with five different ink compositions. Two of the ink compositions had the composition of Example 20, except that one contains twenty parts of maleic anhydride as the inhibitor whereas the second ink contained only five parts of maleic anhydride. The organosol composition of Example 14 was applied to the surface of the printed surface to form a uniform coating of 0.006 inch in thickness. The sheet was then passed through an oven which gradually raised the temperature of the coating to 375° F. The foamable coating and the organosol coating fused and the blowing agent decomposed to form a product having a foam layer of 0.030 inch in thickness and a solid layer covering the foam layer of 0.006 inch in thickness. The product had depressed areas corresponding to the location of the ink composition containing the inhibitor. The depth of the depressions were 0.015 inch with the higher amount and only about 0.005 inch with the lower amount. The product made an excellent floor covering having high wear and stain resistance and excellent indent recovery. Similar products were obtained by replacing the maleic anhydride inhibitor used in this example with each of the following inhibitors: tetrachlorophthalic, hexahydrophthalic anhydride, tetrahydrophthalic anhydride, phthalic anhydride, chlorendic anhydride, 3,3',4,4'-benzophenone tetracarboxylic dianhydride, mercaptobenzothiazole, trimelletic anhydride monoacid chloride, acetoacetanilide, and benzylamine.

*Example 42*

The procedure of Example 41 was followed, except that the foamable composition of Example 1 was utilized in place of the plastisol of Example 3. The resulting product was the reverse of Example 41 in that it had raised areas instead of depressed areas and depressed areas in place of the raised areas. The inhibitor in the ink compositions had caused a decomposition of the blowing agent it contacted prior to the decomposition of the other portions of the sheet.

*Example 43*

The procedure of Example 41 was followed, except that the ink composition of Example 36 was substituted for the composition of Example 20 and after application of the inks and prior to application of the surface coating the sheet was heated to 300° F. This preliminary heating caused the oxalic acid in the ink to migrate into the foamable layer and the gas evolved escaped from the composition. The printing ink composition applied has a thickness of 0.001 inch when dry. The final product had depressions corresponding to the location of the application of the composition of Example 36 which extended for substantially the entire thickness of the foam layer.

*Example 44*

A foamable plastisol was prepared according to Example 2. The plastisol was applied as a uniform layer of 0.009 inch in thickness on the surface of a felt sheet 0.045 inch in thickness. The felt sheet was composed of cellulosic fibers impregnated with 5% of a urea-formaldehyde resin and 25% of a copolymer of butadiene-acrylonitrile. The sheet had been heated to cure the urea-formaldehyde resin. The felt sheet had previously been coated with the size coating of one-half methyl methacrylate and one-half butyl acrylate at the rate of 0.025 lbs. per square yard followed by drying the size coat. The plastisol-coated felt was then passed through an oven heated at 300° F. at the rate of 60 ft. per minute. The oven was 90 ft. long. The sheet was then allowed to cool and fed to a conventional rotogravure printing machine which applied a decoration on the surface of the sheet with five different vinyl printing inks. One of the inks had the composition of Example 26 and contained as the inhibitor tetrachlorophthalic anhydride. Because of the soft surface of the gelled foamable coating, excellent fidelity of print was obtained. The printed sheet was then passed to a reverse roll coater where an organosol coating of 0.005 inch in thickness was applied having the composition of Example 13. The sheet was passed from the coater at a speed of 30 ft. per minute into an oven having three zones each of 30 ft. in length. The zones were heated to 325° F., 425° F., and 425° F., respectively. During this heating operation, the composition became fused and the blowing agent decomposed to foam the foamable layer to a thickness of 0.040 inch. The product was then cooled and wound on a collecting roll. The product had a textured surface caused by depressions of about 0.020 inch in depth which corresponded to the area printed with the ink containing the inhibitor. The product could be utilized directly as a floor covering having excellent indent recovery. The solid transparent wear layer of 0.005 inch in thickness had excellent resistance to wear and staining and the design printed on the surface of the foamable composition was clearly visible through the transparent wear layer.

The product showed instantaneous recovery from spike heel shoes. Utilizing an Armstrong indent tester with a $15/16$-inch diameter dome of silience type pin with 100 lbs. of dead load for 60 seconds dwell, 90% recovery showed within 60 seconds and 100% recovery within 10 minutes. A long term indent test utilizing 3/4 inch diameter domes of silience with 112 and 224 lbs per square inch for 9 days dwell showed complete recovery in one day for the lesser weight and approximately 90% recovery in one week for the higher weight.

*Example 45*

A cellulosic felt sheet impregnated with 15% of polyvinyl acetate was coated on one surface with the size coat of Example 17 at the rate of 0.025 pound per square yard and dried. The coated felt sheet was then passed through a reverse roll coater which applied the plastisol composition of Example 2 in a uniform coating of 0.0015 inch in thickness on one surface of the felt sheet. The sheet was then heated to gel the plastisol which required heating at 300° F. for 30 seconds. The sheet was then cooled and passed to a rotogravure printing machine and printed with a design in the manner described in Example 37. The organosol coating composition of Example 12 was applied over the printed design to give a uniform coating of 0.003 inch in thickness. The coated product was then gradually heated to a temperature of 400° F. to fuse the composition and decompose the blowing agent. The product was then cooled. The resulting product had depressed areas in its surface which corresponded to the portions of the design which contained the foam inhibitor. The product did not have the resiliency of a foam product because of the thinness of the foam layer. This procedure is a simple method of producing a product having an embossed surface which corresponds and is in register with the printed design.

The following Table 6 shows the results of utilizing various compositions following the procedure of Example 79, utilizing the wear layer composition of Example 75:

TABLE 6

| Example No. | Foam Composition | Gel Temp./ Time (° F.) (Minutes) | Ink Composition | Fusion and Foaming Temperature (° F.) (Min.) | Depth of Depression (Percent of Total Thickness) |
| --- | --- | --- | --- | --- | --- |
| 46 | Example 2 | 300/2 | Example 21 | 400/2 | 50 |
| 47 | do | 300/2 | Example 22 | 400/2 | 50 |
| 48 | do | 300/2 | Example 23 | 400/2 | 50 |
| 49 | do | 300/2 | Example 24 | 400/2 | 50 |
| 50 | do | 300/2 | Example 25 | 400/2 | 50 |
| 51 | Example 6 | 340/0.67 | Example 21 | 340/3 | 10 |
| 52 | do | 340/0.67 | Example 23 | 340/3 | 10 |
| 53 | do | 340/0.67 | Example 24 | 340/3 | 50 |
| 54 | do | 340/0.67 | Example 25 | 340/3 | 25 |
| 55 | Example 7 | 400/1 | Example 22 | 400/3 | 40 |
| 56 | do | 400/1 | Example 23 | 400/3 | 25 |
| 57 | do | 400/1 | Example 24 | 400/3 | 40 |
| 58 | do | 400/1 | Example 25 | 400/3 | 40 |
| 59 | Example 8* | | Example 22 | 275/3 | 25 |
| 60 | do | | Example 24 | 275/3 | 10 |
| 61 | do | | Example 25 | 275/3 | 5 |
| 62 | Example 9 | 300/2 | Example 22 | 370/2.5 | 25 |
| 63 | do | 300/2 | Example 24 | 370/2.5 | 25 |
| 64 | Example 10 | 300/2 | Example 22 | 340/2.5 | 5 |
| 65 | Example 76 | 300/2 | Example 21 | 400/2 | 50 |
| 66 | do | 300/2 | Example 22 | 400/2 | 50 |
| 67 | do | 300/2 | Example 23 | 400/2 | 50 |
| 68 | do | 300/2 | Example 24 | 400/2 | 50 |
| 69 | do | 300/2 | Example 25 | 400/2 | 50 |
| 70 | Example 80 | 340/0.67 | Example 23 | 340/3 | 10 |
| 71 | do | 300/2 | Example 22 | 370/2.5 | 5 |
| 72 | do | 300/2 | Example 24 | 370/2.5 | 5 |

*Ink applied to base before foamable composition.

*Example 73*

A foamable plastisol was formulated by grinding the following ingredients on a conventional three-roll mill:

|  | Parts |
| --- | --- |
| Vinyl chloride-vinyl acetate copolymer (dispersion grade) | 100 |
| Dioctyl phthalate | 30 |
| Dipropylene glycol dibenzoate | 30 |
| Stabilizer | 6 |
| Finely divided titanium dioxide | 2.5 |
| Azodicarbonamide [1,1'-azobis(formamide)] blowing agent | 2.5 |

The plastisol had a viscosity of 16,800 centipoises at 25° C. as measured with a Brookfield viscometer using a No. 6 spindle at 10 r.p.m. This plastisol can be pigmented as desired.

*Example 74*

A transparent plastisol was prepared by mixing the following ingredients on a Cowles mixer:

| | Parts |
|---|---|
| Vinyl chloride-vinyl acetate copolymer (dispersion grade) | 100 |
| Dioctyl phthalate | 30 |
| Dipropylene glycol dibenzoate | 30 |
| Stabilizer | 6 |

*Example 75*

A transparent organosol was prepared by mixing the following ingredients:

| | Parts |
|---|---|
| Vinyl chloride polymer (dispersion grade) | 100 |
| Dioctyl phthalate | 17 |
| Tricresyl phosphate | 8.5 |
| Polyester plasticizer | 8.5 |
| Stabilizer | 2.0 |
| Mineral spirits | 24 |

*Example 76*

A foamable plastisol was prepared having the following composition:

| | Parts |
|---|---|
| Polyvinyl chloride (high molecular weight) | 100 |
| Polyvinyl chloride (low molecular weight) | 100 |
| Azodicarbonamide | 3 |
| Pigment (TiO$_2$) | 7 |
| Dibasic lead phosphite | 7 |
| Butyl benzyl phthalate | 100 |

The plastisol had a Brookfield viscosity of 6,400 (2 r.p.m., No. 3 spindle).

*Example 77*

The plastisol of Example 73 is applied as a uniform coating of about 0.008 inch in thickness on the surface of a release paper. The release paper has a coating of a complex compound of the Werner type in which a trivalent nuclear chromium atom is coordinated with an acrylic carboxylic acido group having at least 10 carbon atoms. Such a composition is disclosed in United States Patent 2,273,040, issued February 17, 1942. The plastisol coating is then heated to a temperature of 300° F. for 1 minute to gel the composition. The gelled coating is then cooled. The cooled gelled product is then passed through a rotogravure press which prints a five-color design on the surface of the gelled coating. Some of the printing composition applied had the formula of Example 20 wherein the inhibitor was hydroquinone. The remaining printing composition did not contain an inhibitor. The plastisol composition of Example 74 was then coated on the surface of the printed, gelled coating to form a uniform coating of 0.005 inch in thickness. The coatings were then heated to a temperature of 400° F. for a period of 2 minutes to fuse the compositions and completely decompose the blowing agent to form a foam layer of 0.040 inch thickness integrally bonded to the wear layer of 0.005 inch thickness. The fused and foamed product was then cooled and the release paper stripped from the back of the product. The resulting product has a foam underlayer with a solid resinous wear layer integrally bonded thereto. The product had depressions in its surface corresponding to the places where the ink containing the inhibitor was applied. The depressions were about 0.030 inch in depth.

*Example 78*

A foamable plastisol is formulated by grinding the following ingredients on a conventional Cowles mixer:

| | Parts |
|---|---|
| Vinyl chloride-vinyl acetate copolymer (dispersion grade) | 100 |
| Dioctyl phthalate | 60 |
| Alkyl aryl hydrocarbon | 5 |
| Dibasic lead phosphite | 1 |
| Finely divided titanium dioxide | 2 |
| Azodicarbonamide | 4 |

The plastisol has a viscosity of 2,500 centipoises at 25° C. as measured with a Brookfield viscometer using a No. 6 spindle at 10 r.p.m. The plastisol was applied as a uniform coating of 0.008 inch on the surface of a 0.025 inch thick cellulose felt sheet impregnated with 9 percent polyvinyl acetate and 30 percent hydrocarbon resin. The felt sheet had previously been coated with the size coating of Example 16 at the rate of 0.025 pound per square yard and dried. The plastisol coating is then heated to a temperature of 310° F. for a period of 50 seconds to obtain a composition temperature of 250° F. thereby gelling the coating into a film having an elongation of 100 percent. The gelled sheet was then passed through a rotogravure press which applied five different ink compositions. Two of the ink compositions had the composition of Example 20 except that one contains 20 parts of maleic anhydride as the inhibitor whereas the second one contained only five parts of maleic anhydride. The organosol composition of Example 75 was applied to the surface of the printed surface to form a uniform coating of 0.004 inch in thickness. The sheet was then passed through an oven which gradually raised the temperature of the coating to 400° F. The foamable coating and the organosol coating fused and the blowing agent decomposed to form a product having a foam layer of 0.040 inch in thickness and a solid layer covering the foam layer of 0.004 inch in thickness. The product had depressed areas corresponding to the location of the ink composition containing the inhibitor. The depth of the depressions were 0.03 inch with the higher amount and only about 0.01 inch with the lower amount. The product made an excellent floor covering having high wear and stain resistance and excellent indent recovery.

*Example 79*

A foamable plastisol is prepared according to Example 76. The plastisol had a Brookfield viscosity of 6,400 at 25° C. using a No. 3 spindle at 2 r.p.m. The plastisol was applied as a uniform layer of 0.008 inch in thickness on the surface of a felt sheet 0.045 inch in thickness. The felt sheet was composed of cellulosic fibers impregnated with 5% of a urea-formaldehyde resin and 25% of a copolymer of butadiene-acrylonitrile. The sheet had been heated to cure the urea-formaldehyde resin. The felt sheet had previously been coated with the size coating of one-half methyl methacrylate and one-half butyl acrylate at the rate of 0.025 lb. per square yard followed by drying the size coat. The plastisol coated felt was then passed through an oven heated at 300° F. at the rate of 60 ft. per minute. The oven was 90 ft. long. The sheet was then allowed to cool and fed to a conventional rotogravure printing machine which applied a decoration on the surface of the sheet with five different vinyl printing inks. One of the inks had the composition of Example 20 and contained as the inhibitor phthalate anhydride. Because of the soft surface of the gelled foamable coating, excellent fidelity of print was obtained. The printed sheet was then passed to a reverse roll coater where an organosol coating of 0.005 inch in thickness was applied having the composition of Example 75. The sheet was passed from the coater at a speed of 30 ft. per minute into an oven having three zones each of 30 ft. in length. The zones were heated to 325° F., 425° F., and 425° F., respectively. During this heating operation, the composition became fused and the blowing agent decomposed to foam the foamable layer to a thickness of 0.040 inch. The product was then cooled and wound on a collecting roll. The product had a textured surface caused by depressions of 0.020 inch in depth which correspond to the area printed with the ink containing the inhibitor. The product could be utilized directly as a floor covering having excellent indent recovery. The solid transparent wear layer of 0.005 inch in thickness had excellent resistance to wear and staining and the design printed on the surface of the foamable composition was clearly visible through the transparent wear layer.

The product showed instantaneous recovery from spike heel shoes. Utilizing an Armstrong indent tester with a 15/16 inch diameter dome of silence type pin with 100 lbs. of dead load for 60 seconds dwell, 90% recovery showed within 60 seconds and 100% recovery within 10 minutes. A long term indent test utilizing 3/4 inch diameter domes of silence with 112 and 224 lbs. per square inch for 9 days dwell showed complete recovery in one day for the lesser weight and approximately 90% recovery in one week for the higher weight.

*Example 80*

A foamable plastisol was prepared having the following composition:

| | Parts |
|---|---|
| Polyvinylchloride (high molecular weight) | 50 |
| Polyvinylchloride (low molecular weight) | 50 |
| Dioctyl phthalate | 75 |
| Dibasic lead phosphite | 2 |
| Diazoaminobenzene | 5 |

*Example 81*

A polyvinyl chloride composition sheet of 0.042 inch in thickness was passed through a roll coater which applied the plastisol composition of Example 1, except that two parts of zinc oxide were added to the formula, in a uniform coating of 0.004 inch in thickness on one surface of the sheet. The sheet was then heated to gel the plastisol which required heating at 300° F. for 30 seconds. The sheet was then cooled and passed to a rotogravure printing press which printed a five-color design on the surface of the gelled coating. One of the colors of the design was printed with the ink composition of Example 20 wherein the inhibitor was thiourea. The plastisol coating composition of Example 12 was applied over the printed design to give a uniform coating of 0.010 inch in thickness. The coated product was then gradually heated to a temperature of 385° F. to fuse the composition and decompose the blowing agent. The product was then cooled. The resulting product had a thickness of about 0.65 inch with depressed areas in its surface which corresponded to the portion of the design which contained the inhibitor having a depth of about 0.009 inch. A similar product was produced by substituting thioacetamide for the thiourea. In both of these products, the inhibitor prevented the formation of any gas cells in the inhibited area.

Any departure from the foregoing description which conforms to the present invention is intended to be included within the scope of the claims.

What is claimed is:

1. In the process for producing a resinous cellular layer which comprises incorporating a blowing agent in a resinous composition and subsequently uniformly heating the composition to the decomposition temperature of the blowing agent and forming said cellular layer, the improvement which comprises producing said cellular layer with portions of said layer having a thickness contrasting with the remaining part of said layer by applying to said portions of the surface prior to said uniform heating an inhibitor which is capable of penetrating into said composition and substantially alters the temperature at which at least some of the blowing agent in said portions decomposes, and controlling the extent of said uniform heating with respect to time and temperature thereof to produce said contrast in thickness.

2. The process of claim 1 wherein said inhibitor is at least partially soluble in at least one component of said resinous composition below the decomposition temperature of said blowing agent.

3. The process of claim 2 wherein said resinous composition is heated in order to at least partially fuse the resinous composition prior to the application of said inhibitor and the decomposition of said blowing agent.

4. The process of claim 2 wherein said inhibitor is applied to portions of a base and said resinous composition containing said blowing agent is applied over said inhibitor and base prior to the said heating to decompose said blowing agent.

5. The process of claim 2 wherein said resinous composition is a polymer of vinyl chloride and said heating is sufficient to fuse said resinous composition.

6. The process of claim 2 wherein said blowing agent is an azo compound having a decomposition temperature of at least 200° F.

7. The process of claim 2 wherein said blowing agent is 1,1'-azobisformamide.

8. The process of claim 2 wherein said inhibitor is printed on said layer in the form of a design and a second layer of vinyl resinous composition is applied over the printed inhibitor prior to said uniform heating.

9. The process of claim 2 wherein said inhibitor raises the decomposition temperature of the blowing agent and said portions of the surface are depressed below said remaining part of the surface.

10. The process of claim 2 wherein said blowing agent is azobisisobutyronitrile.

11. The process of claim 2 wherein said blowing agent is diazoaminobenzene.

12. The process of claim 2 wherein said blowing agent is N,N'-dimethyl-N,N'-dinitroso terephthalamide.

13. The process of claim 2 wherein said blowing agent is 4,4'-oxybis (benzene sulfonyl hydrazide).

14. The process of claim 2 wherein said blowing agent is p,p'-oxybis (benzene sulfonyl semi-carbazide).

15. The process of claim 2 wherein said blowing agent is aminoguanidine bicarbonate.

16. The process of claim 2 wherein said inhibitor is an organic acid having at least two carboxyl groups.

17. The process of claim 2 wherein said inhibitor is an organic acid anhydride.

18. The process of claim 2 wherein said inhibitor is a polyhydroxy alcohol.

19. The process of claim 2 wherein said inhibitor is a cyclic amine.

20. The process of claim 2 wherein said inhibitor is a polyketone.

21. The process of claim 2 wherein said inhibitor is printed on said portions of the surface in the form of a design by a rotogravure printing process.

22. The process of claim 2 wherein said resinous composition is formed into a self-supporting sheet of at least partially fused resinous composition prior to the application of said inhibitor.

23. The process of claim 2 wherein said blowing agent is a nitroso compound having a decomposition temperature of at least 200° F.

24. The process of claim 2 wherein said blowing agent is a hydrazide having a decomposition temperature of at least 200° F.

25. The process of claim 2 wherein said blowing agent is a guanyl compound having a decomposition temperature of at least 200° F.

26. The process of claim 2 wherein said layer is heated to a temperature below the decomposition temperature of said blowing agent after application of said inhibitor and prior to decomposition of said blowing agent.

27. The process of claim 2 wherein one surface of said resinous composition containing the blowing agent is laminated to a web backing and the opposite surface is laminated to a resinous composition wear layer.

28. In the process for producing a decorative product having a non-cellular resinous layer bonded to a cellular layer which comprises applying a first coating of a thermoplastic vinyl resinous composition containing an effective amount of blowing agent to a base, heating to gel the first coating, applying a second layer of a thermoplastic vinyl resinous composition to cover said first coating, heating said first and second coatings to fuse the resinous compositions and decompose the blowing agent and thereafter cooling the product, the improvement which comprises producing said product with first portions thereof having a thickness contrasting with the thickness of second portions thereof, by applying to first portions of the surface of said gelled coating corresponding to said first portions of the product an inhibitor for said blowing agent which is capable of substantially altering the temperature at which said blowing agent will decompose and which is at least partially soluble in said coating, and controlling said heating of both of said first and second portions in like manner with respect to time and temperature thereof to decompose said blowing agent selectively in one of said first and said second portions to a greater extent than in the other of said first and second portions.

29. The process of claim 28 wherein said blowing agent is 1,1'-azobisformamide.

30. The process of claim 28 wherein said blowing agent is an azo compound having a decomposition temperature of at least 200° F.

31. The process of claim 30 wherein said inhibitor is a reducing agent.

32. The process of claim 30 wherein said inhibitor is an organic acid.

33. The process of claim 30 wherein said inhibitor is an organic acid anhydride.

34. The process of claim 30 wherein said inhibitor is a polyhydroxy alcohol.

35. The process of claim 30 wherein said inhibitor is a mercaptan.

36. The process of claim 30 wherein said inhibitor is an organic acid halide.

37. The process of claim 30 wherein said blowing agent is 1,1'-azobisformamide and said inhibitor is fumaric acid.

38. The process of claim 30 wherein said blowing agent is 1,1'-azobisformamide and said inhibitor is trimellitic anhydride.

39. The process of claim 30 wherein said blowing agent is 1,1'-azobisformamide and said inhibitor is hydroquinone.

40. The process of claim 30 wherein said blowing agent is 1,1'-azobisformamide and said inhibitor is terephthaloyl chloride.

41. The process of claim 30 wherein said blowing agent is 1,1'-azobisformamide and said inhibitor is maleic anhydride.

42. The process of claim 30 wherein said blowing agent is 1,1'-azobisformamide and said inhibitor is tetrachlorophthalic anhydride.

43. The process of claim 30 wherein said blowing agent is 1,1'-azobisformamide and said inhibitor is hexahydrophthalic anhydride.

44. The process of claim 30 wherein said blowing agent is 1,1'-azobisformamide and said inhibitor is tetrahydrophthalic anhydride.

45. The process of claim 30 wherein said blowing agent is 1,1'-azobisformamide and said inhibitor is phthalic anhydride.

46. The process of claim 30 wherein said blowing agent is 1,1'-azobisformamide and said inhibitor is chlorendic anhydride.

47. The process of claim 30 wherein said blowing agent is 1,1'-azobisformamide and said inhibitor is 3,3',4,4'-benzophenone tetracarboxylic dianhydride.

48. The process of claim 30 wherein said blowing agent is 1,1'-azobisformamide and said inhibitor is mercaptobenzothiazole.

49. The process of claim 30 wherein said blowing agent is 1,1'-azobisformamide and said inhibitor is trimelletic anhydride monoacid chloride.

50. The process of claim 30 wherein said blowing agent is 1,1'-azobisformamide and said inhibitor is acetoacetanilide.

51. The process of claim 30 wherein said blowing agent is 1,1'-azobisformamide and said inhibitor is benzylamine.

52. The process of claim 30 wherein said blowing agent is 1,1'-azobisformamide and said inhibitor is oxalic acid.

53. The process of claim 30 wherein said blowing agent is 1,1'-azobisformamide and said inhibitor is thiourea.

54. The process of claim 30 wherein said blowing agent is 1,1'-azobisformamide and said inhibitor is thioacetamide.

55. In the process of producing a resinous cellular layer laminated to a non-cellular resinous layer which comprises incorporating a blowing agent in a first resinous composition layer, heating to at least gel the composition, applying a second resinous composition layer which does not contain a blowing agent to the surface of the gelled first composition and subsequently heating the composition to the decomposition temperature of the blowing agent and forming said cellular layer, the improvement which comprises producing said laminate with portions of said laminate having a thickness contrasting with adjacent parts of the laminate by applying to the surface of one of said first and said second composition layers in the area corresponding to said portions prior to said heating to decompose the blowing agent, an inhibitor which substantially alters the temperature at which the blowing agent which it contacts decomposes and which is at least partially soluble in said resinous compositions and controlling the extent of said heating of both of said portions and adjacent parts in like manner with respect to time and temperature thereof to produce said contrast in thickness.

56. The process of claim 55 wherein said blowing agent is 1,1'-azobisformamide.

57. The process of claim 55 wherein said laminate is heated below the decomposition temperature of said blowing agent after application of said inhibitor and prior to decomposition of said blowing agent to promote the migration of said inhibitor into the resinous compositions.

58. The process of claim 55 wherein said inhibitor is maleic anhydride and said blowing agent is 1,1'-azobisformamide.

59. In the process for producing a product containing a resinous cellular foam layer which comprises incorporating a blowing agent in a resinous composition and subsequently heating the composition to the decomposition temperature of the blowing agent and forming said cellular layer, the improvement which comprises producing said cellular foam layer with portions of said layer having a thickness contrasting with the remaining part of said layer by applying to one surface of said layer, prior to said heating, a decalcomania having on its surface contacting only said portions a composition containing an inhibitor which substantially alters the temperature at which the blowing agent which it contacts decomposes and which is at least partially soluble in said resinous composition at a temperature below the decomposition temperature of said blowing agent, and controlling the extent of said heating of both of said portions and remaining part in like manner with respect to time and temperature thereof to product said contrast in thickness.

60. The process of claim 59 wherein said blowing agent is 1,1'-azobisformamide.

61. The process of claim 59 wherein said inhibitor is selected from the group consisting of maleic anhydride and trimellitic anhydride and said blowing agent is 1,1'-azobisformamide.

62. In the process for producing a resinous cellular layer which comprises preparing a sheet of a foamable resinous composition having a blowing agent incorporated in at least a stratum thereof, and subsequently heating said foamable composition to decompose said blowing agent, thereby forming said cellular layer, the improvement which comprises producing said cellular layer with first portions thereof having a thickness contrasting with the thickness of second portions thereof, said first and second portions corresponding respectively to first and second areas of said sheet, by applying to the surface of said foamable resinous composition in said first area an inhibitor for said blowing agent which is capable of penetrating into said resinous composition and substantially altering the decomposition temperature thereof and thereafter heating both of said first and second areas in like manner to decompose selectively the blowing agent in one of said first and said second areas to a greater extent than in the other of said first and second areas.

No references cited.

EARL M. BERGERT, *Primary Examiner.*

C. B. COSBY, *Assistant Examiner.*

UNITED STATES PATENT OFFICE
CERTIFICATE OF CORRECTION

Patent No. 3,293,094            December 20, 1966

R. Frank Nairn et al.

It is hereby certified that error appears in the above numbered patent requiring correction and that the said Letters Patent should read as corrected below.

Column 3, line 57, for "formable" read -- foamable --; line 58, for "effects" read -- affects --; column 4, line 49, for "from" read -- than --; column 6, line 12, for "90" read -- 80 --; lines 39 and 52, for "56", each occurrence, read -- 66 --; column 9, line 49, for "ethylene" read -- ethylene, --; column 10, line 17, strike out "it"; line 66, for "compostiion" read -- composition --; column 12, line 13, for "p,p'-Oxybis" read -- p,p'-Oxybis --; column 13, line 35, for "0.25" read -- 0.025 --; line 36, for "30 petroleum" read -- 30 per cent petroleum --; line 50, for "homop lymer" read -- homopolymer --; column 14, line 9, for "Unusually" read -- Unusual --; column 15, line 2, for "n-butyoyl" read -- n-butyryl --; line 5, for "myristol" read -- myristoyl --; line 13, for "benyoyl" read -- benzoyl --; lines 14 and 16, for "m-bromobenyoyl", each occurrence, read -- m-bromobenzoyl --; line 16, for "2,4-dichlorobenyoyl" read -- 2,4-dichlorobenzoyl --; line 17, for "p-phenylazobenyoyl" read -- p-phenylazobenzoyl --; line 24, for "hept-5-end" read -- hept-5-ene --; line 40, for "anydride" read -- anhydride --; column 16, line 60, strike out "31"; lines 69 and 70, strike out "p-nitrocyanate, 1-naphthyl isocyanate, p-tolyl isocyanate"; column 17, line 20, for "trichloroisocyanuricic" read -- trichloroisocyanuric --; column 23, line 39, for "hydraxide" read -- hydrazide --; column 24, line 53, for "pasticizer" read -- plasticizer --; column 27, line 45, for "300 F." read -- 300° F. --; column 28, line 11, for "at" read -- of --; column 29, lines 70 and 74, for "silience", each occurrence, read -- silence --; column 36, line 68, for "product" read -- produce --; column 38, line 7, for "and second areas" read -- and said second areas --.

Signed and sealed this 24th day of October 1967.

(SEAL)
Attest:

EDWARD M. FLETCHER, JR.          EDWARD J. BRENNER
Attesting Officer               Commissioner of Patents

UNITED STATES PATENT OFFICE
CERTIFICATE OF CORRECTION

Patent No. 3,293,094             December 20, 1966

R. Frank Nairn et al.

It is hereby certified that error appears in the above numbered patent requiring correction and that the said Letters Patent should read as corrected below.

Column 11, lines 7 and 8, for "recinoleates" read -- ricinoleates --.

Signed and sealed this 12th day of November 1968.

(SEAL)
Attest:

Edward M. Fletcher, Jr.
Attesting Officer

EDWARD J. BRENNER
Commissioner of Patents